(12) United States Patent
Funawatari et al.

(10) Patent No.: US 7,647,603 B2
(45) Date of Patent: Jan. 12, 2010

(54) DISC CARTRIDGE

(75) Inventors: Takatsugu Funawatari, Miyagi (JP); Susumu Shibagaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 149 days.

(21) Appl. No.: 11/667,812

(22) PCT Filed: Sep. 26, 2006

(86) PCT No.: PCT/JP2006/319045
§ 371 (c)(1), (2), (4) Date: Jan. 23, 2008

(87) PCT Pub. No.: WO2007/040094
PCT Pub. Date: Apr. 12, 2007

(65) Prior Publication Data
US 2009/0013344 A1 Jan. 8, 2009

(30) Foreign Application Priority Data
Sep. 30, 2005 (JP) .............................. 2005-288794

(51) Int. Cl.
*G11B 23/03* (2006.01)
(52) U.S. Cl. ..................................................... 720/740
(58) Field of Classification Search ................. 720/740, 720/730, 742, 741, 632, 739; 360/133
See application file for complete search history.

(56) References Cited
U.S. PATENT DOCUMENTS
2004/0062175 A1* 4/2004 Inoue ........................ 369/77.2

2004/0080992 A1 4/2004 Obata et al.

(Continued)

FOREIGN PATENT DOCUMENTS
EP 1 659 586 5/2006

(Continued)

*Primary Examiner*—Allen T Cao
(74) *Attorney, Agent, or Firm*—Robert J. Depke; Rockey, Depke & Lyons, LLC

(57) ABSTRACT

A disc cartridge includes a cartridge main body 2, a rotation wheel 4 rotatably accommodated in the cartridge main body 2, a pair of shutter plates 5a, 5b interposed between a lower shell 7 and the rotation wheel 4 for releasing a first opening 24 of a lower shell 7 and a second opening 44 of the rotation wheel 4 in association with the rotation of the rotation wheel 4 when the first opening 24 coincides with the second opening 44, and a locking member 72 for prohibiting the rotation of the rotation wheel 4. The locking member 72 includes a locking portion 76 engaged with an engaging recessed portion 85 of the rotation wheel 4 for locking the rotation wheel 4 at a position where the shutter plates 5a, 5b close the first opening 24 and a first and second unlocking pieces 77, 78 for releasing the state that the locking portion 76 is engaged with the engaging recessed portion 85. The first unlocking piece 77 is faced to an insertion guide groove 25b on the front surface of the cartridge main body 2, and the second unlocking piece 78 is faced to a guide groove 15 formed to a side surface of the cartridge main body 2 in the inserting direction thereof. The rotation wheel 4 unlocked by depressing any of the first and second unlocking pieces 77, 78. With this arrangement, an unlocking mechanism of a rerecording and/or replaying device can be simplified.

5 Claims, 26 Drawing Sheets

U.S. PATENT DOCUMENTS

2006/0259919 A1 * 11/2006 Funawatari et al. ......... 720/741
2006/0294535 A1 * 12/2006 Funawatari et al. ......... 720/734

FOREIGN PATENT DOCUMENTS

| | | |
|---|---|---|
| JP | 2003-109343 | 4/2003 |
| JP | 2004-318930 | 11/2004 |
| JP | 2005-78675 | 3/2005 |
| JP | 2006244534 A * | 9/2006 |
| WO | WO 2005-022534 | 3/2005 |

* cited by examiner

US 7,647,603 B2

DISC CARTRIDGE

This application is a 371 U.S. National Stage filing of PCT/JP2006/319045, filed Sep. 26, 2006, which claims priority to Japanese Patent Application No. JP2005-288794 filed Sep. 30, 2005 all of which are incorporated herein by reference

TECHNICAL FIELD

The present invention relates to a disc cartridge having a mechanism for locking a shutter for opening and closing an opening for exposing a part of a disc acting as a recording medium to the outside in a state that the opening is closed.

BACKGROUND ART

A disc cartridge includes, for example, a disc cartridge shown in Japanese Unexamined Patent Application Publication No. 2003-109343 and a disc cartridge shown in Japanese Unexamined Patent Application Publication No. 2005-78675 The disc cartridge shown in Japanese Unexamined Patent Application Publication No. 2003-109343 is a standard size disc cartridge using an optical disc having a diameter of 12 cm as a recording medium, and the disc cartridge shown in Japanese Unexamined Patent Application Publication No. 2005-78675 is a small size disc cartridge using an optical disc having a diameter of 8 cm as a recording medium. Since compatibility is established between these two disc cartridges by employing a common recording format to the optical discs, information signals can be recorded and/or replayed by a common recording and/or replaying device.

The standard size disc cartridge of Japanese Unexamined Patent Application Publication No. 2003-109343 includes a cartridge main body, an inner rotor acting as a rotation wheel, and a pair of shutter plates. The cartridge main body has a first opening formed to a bottom surface for recording and/or replaying, the inner rotor is rotatably accommodated in the cartridge main body as well as accommodates an optical disc and has a second opening formed thereto in correspondence to the first opening of the cartridge main body so that the optical disc can be faced to the outside therethrough and the pair of shutter plates are interposed between the bottom surface of the cartridge main body and the inner rotor and turned in association with the rotation of the inner rotor and release the first opening and the second opening when they coincide with each other. Further, the standard size disc cartridge includes a locking mechanism for locking the pair of shutter plates by locking the rotation of the inner rotor in a state that they close the first and second openings.

The locking mechanism has a locking member for locking the inner rotor. The locking member is turnably mounted on a support shaft formed on the inner surface of the cartridge main body, has a locking portion as a stopper piece formed thereto so as to be in sliding contact with the outer peripheral portion of the inner rotor and a unlocking portion formed thereto. The unlocking portion is composed of a manipulating projection facing the outside from a side surface of the cartridge main body.

When the disc cartridge is inserted into a recording and/or replaying device, the unlocking portion of the locking member is depressed by a rack rod on the recording and/or replaying device side, the locking member is turned thereby, and the locking portion is separated from the outer peripheral portion of the inner rotor so that the inner rotor is placed in a rotatable state. Next, as the disc cartridge is transported to a recording and/or replaying position, the inner rotor is rotated by the rack rod meshed with a gear, and the pair of shutter plates is also turned in association with the rotation of the inner rotor. Then, when the first opening of the cartridge main body coincides with the second opening of the inner rotor at a recording and/or replaying position, the disc cartridge is placed in a recording/replaying possible state with its optical disc facing to the outside.

Further, the small size disc cartridge of Japanese Unexamined Patent Application Publication No. 2005-78675 also has approximately the same arrangement as the disc cartridge of Japanese Unexamined Patent Application Publication No. 2003-109343 described above. That is, the disc cartridge of Japanese Unexamined Patent Application Publication No. 2005-78675 has a rotation wheel corresponding to an inner rotor and rotatably accommodated in a cartridge main body, and a pair of shutter plates is interposed between the rotation wheel and the cartridge main body.

In the disc cartridge of Japanese Unexamined Patent Application Publication No. 2005-78675, a locking mechanism is arranged differently from the locking mechanism of the disc cartridge of Japanese Unexamined Patent Application Publication No. 2003-109343 described above. That is, the locking mechanism in the disc cartridge of Japanese Unexamined Patent Application Publication No. 2005-78675 has a locking member for locking the rotation wheel. The locking member is turnably mounted on a support shaft formed to the inner surface of a lower shell constituting a cartridge main body, and has a locking portion formed thereto so that it is engaged with an engaging recessed portion formed to the outer peripheral portion of the rotation wheel. Further, the locking member has an unlocking piece. The unlocking piece is faced to one of groove portions formed to the vicinity of both the corner portions of the front surface of the cartridge main body acting as an insertion edge to a recording and/or replaying device.

When the disc cartridge of the Japanese Unexamined Patent Application Publication No. 2005-78675 is inserted into the recording and/or replaying device, the unlocking member enters one of the groove portions of the front surface of the cartridge main body and depresses the unlocking piece of the locking member, thereby the locking member is turned, the locking portion of locking member is disengaged from the engaging recessed portion of the rotation wheel, and thus the rotation wheel is placed in a rotatable state. When the rotation wheel is rotated, the pair of shutter plates is also turned in association with the rotation of the rotation wheel, and the first opening of the cartridge main body coincides with the second opening of the rotation wheel at the recording and/or replaying position, thereby the disc cartridge is placed in a recording/replaying possible state with its optical disc facing to the outside.

Incidentally, in the small size disc cartridge of Japanese Unexamined Patent Application Publication No. 2005-78675, the groove portions formed to both the sides of the front surface acting as the insertion edge to the recording and/or replaying device are act as insertion guide grooves when the disc cartridge is inserted into a recording and/or replaying device commonly used with the disc cartridge of Japanese Unexamined Patent Application Publication No. 2003-109343. That is, in the recording and/or replaying device in which the disc cartridge of Japanese Unexamined Patent Application Publication No. 2003-109343 and the disc cartridge of Japanese Unexamined Patent Application Publication No. 2005-78675 can be mounted, when it is intended to position the two disc cartridges using location holes and alignment holes formed to the bottom surfaces of them, positioning pins corresponding to the positions of the location holes and the alignment holes of the respective disc cartridges must be provided. In this case, the positioning pins corresponding to the small size disc cartridge of Japanese Unexamined Patent Application Publication No. 2005-78675 are disposed inward of the positioning pins of the disc cartridge of Japanese Unexamined Patent Application Publication No. 2003-109343. However, when the positioning pins for the disc cartridge of Japanese Unexamined Patent Application Publication No. 2005-78675 are disposed, they interfere with the disc cartridge of Japanese Unexamined Patent Application Publication No. 2003-109343. To overcome the problem, it is necessary to provide a positioning pin moving mechanism for the disc cartridge of Japanese Unexamined Patent Application Publication No. 2005-78675 and to retract the positioning pins for the disc cartridge of Japanese Unexamined Patent Application Publication No. 2005-78675 when the disc cartridge of Japanese Unexamined Patent Application Publication No. 2003-109343 is mounted to prevent them from interfering with the disc cartridge of Japanese Unexamined Patent Application Publication No. 2003-109343. However, provision of the moving mechanism makes the arrangement of the recording and/or replaying device complex. Accordingly, in the disc cartridge of Japanese Unexamined Patent Application Publication No. 2005-78675, the shutters are unlocked as well as positioning is carried out by engaging the positioning pins with the groove portions formed to both the sides of the front surface acting as the insertion edge to the recording and/or replaying device. That is, position can be carried out using the pair of the groove portions on the front surface without using the location hole and the alignment hole on the bottom surface of the cartridge main body.

However, since even the disc cartridge of Japanese Unexamined Patent Application Publication No. 2005-78675 is designed such that it is positioned using the location hole and the alignment hole when it is mounted on the recording and/or replaying device, it is preferable to position the disc cartridge using the location hole and the alignment hole as much as possible. This is because when the disc cartridge is positioned using the groove portions, an error may occur to a mounting position.

Accordingly, when the disc cartridge of Japanese Unexamined Patent Application Publication No. 2005-78675 is positioned in a recording and/or replaying device dedicated for the disc cartridge of Japanese Unexamined Patent Application Publication No. 2005-78675, it is preferable to position it using a location hole and an alignment hole on the bottom surface of a cartridge main body because a positioning accuracy is also improved.

Accordingly, an object of the present invention, which was made in view of the above problems, is to provide a disc cartridge capable of unlocking shutter plates at a plurality of positions so that a dedicated recording and/or replaying device and a recording and/or replaying device commonly used with a standard size disc cartridge can be easily designed with a simplified arrangement.

DISCLOSURE OF INVENTION

A disc cartridge according to the present invention includes a cartridge main body having a first opening for recording and/or replaying formed to a bottom surface, a groove formed to a front surface acting as an insertion edge to a recording and/or replaying device, and a guide groove formed to at least one side surface adjacent to the front surface, a rotation wheel rotatably accommodated in the cartridge main body as well as accommodating a disc and having a second opening corresponding to the first opening for facing the accommodated disc to the outside, a shutter mechanism interposed between the bottom surface of the cartridge main body and the rotation wheel for releasing the first and second openings in association with the rotation of the rotation wheel when the first opening coincides with the second opening, and a locking member rotatably attached to the inside of the cartridge main body and having a locking portion engaged with an engaging recessed portion formed to the outer peripheral side of the rotation wheel for locking the rotation wheel at a position where the shutter mechanism closes the first opening and first and second unlocking portions for releasing the state that the locking portion is engaged with the engaging recessed portion, wherein the first unlocking portion is faced to the groove, and the second unlocking portion is faced to the guide groove.

According to the present invention, since lock can be released at a plurality of positions by disposing the first and second unlocking portions to the locking member, a dedicated recording and/or replaying device and a recording and/or replaying device commonly used with a standard size disc cartridge can be easily designed with a simplified arrangement.

BEST MODE FOR CARRYING OUT THE INVENTION

Figure 1:
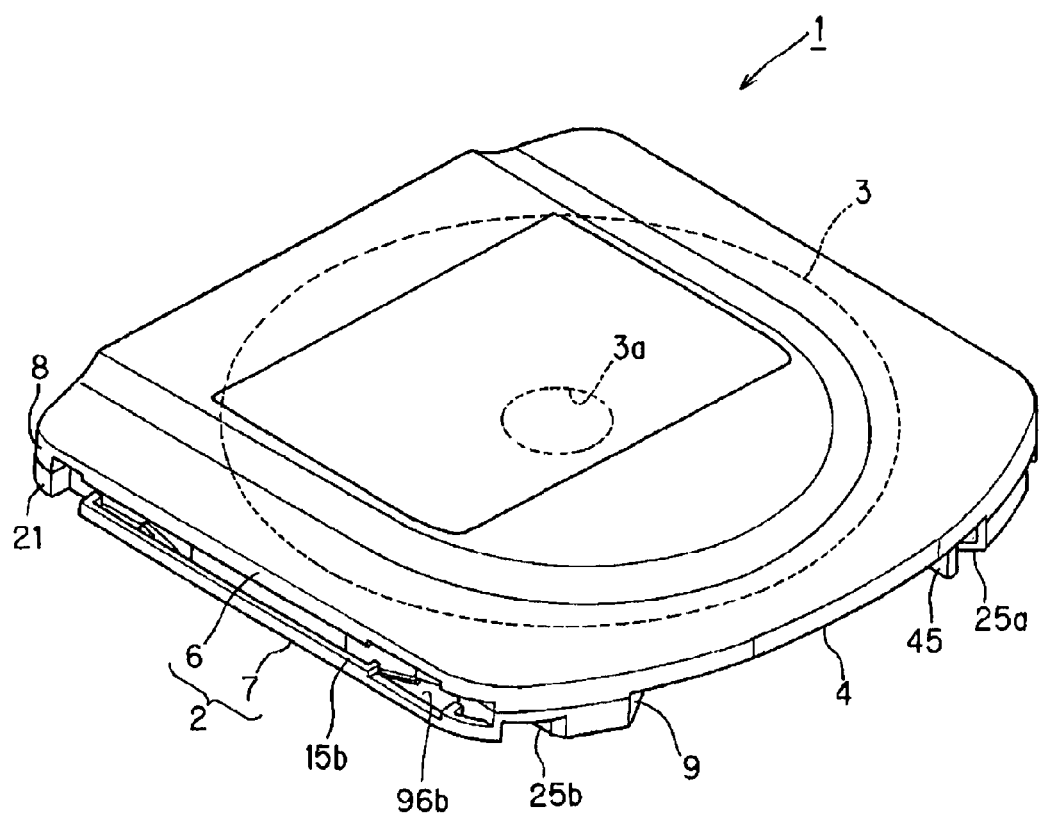
FIG. 1 is a perspective view of a disc cartridge to which the present invention is applied when viewed from an upper shell side.

A disc cartridge to which the present invention is applied will be explained below referring to the drawings. The disc cartridge to which the present invention is applied is a disc cartridge which can be also mounted in the recording and/or replaying device for the standard size disc cartridge shown in Japanese Unexamined Patent Application Publication No. 2003-109343 described above. The disc cartridge of Japanese Unexamined Patent Application Publication No. 2003-109343 employs an optical disc having a diameter of approximately 12 cm as a recording medium, whereas the disc cartridge to which the present invention is applied employs an optical disc which corresponds to the disc cartridge of Japanese Unexamined Patent Application Publication No. 2005-78675 described and has a diameter of, for example, 8 cm smaller than the standard size disc cartridge as a recording medium. Since the disc cartridge to which the present invention is applied is a small disc cartridge using the optical disc having the diameter smaller than that of the disc cartridge of Japanese Unexamined Patent Application Publication No. 2003-109343, it is excellent in portability although the recording capacity thereof is smaller than the standard size disc cartridge.

Figure 2:
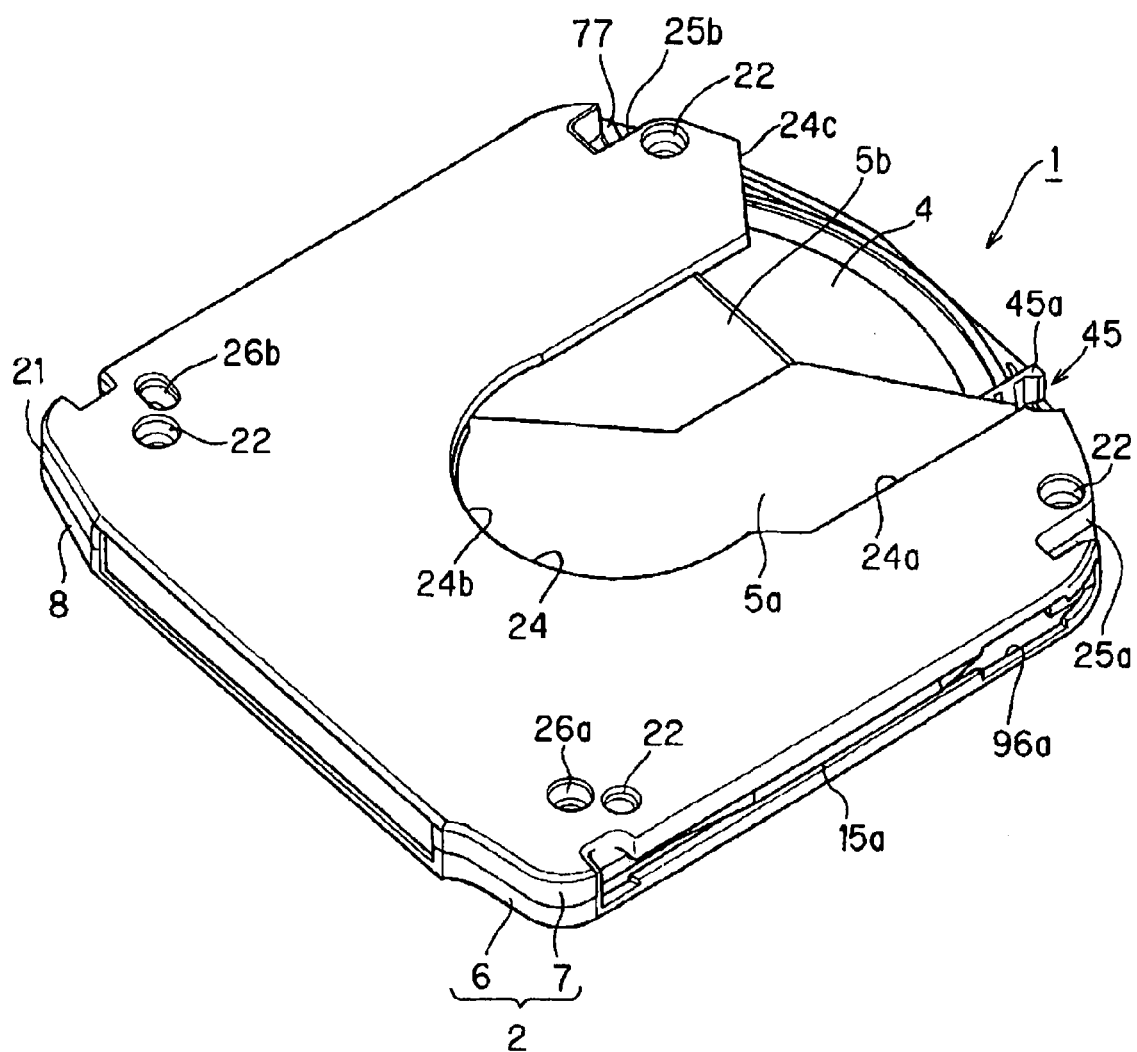
FIG. 2 is a perspective view of the disc cartridge when viewed from a lower shell side.
Figure 3:
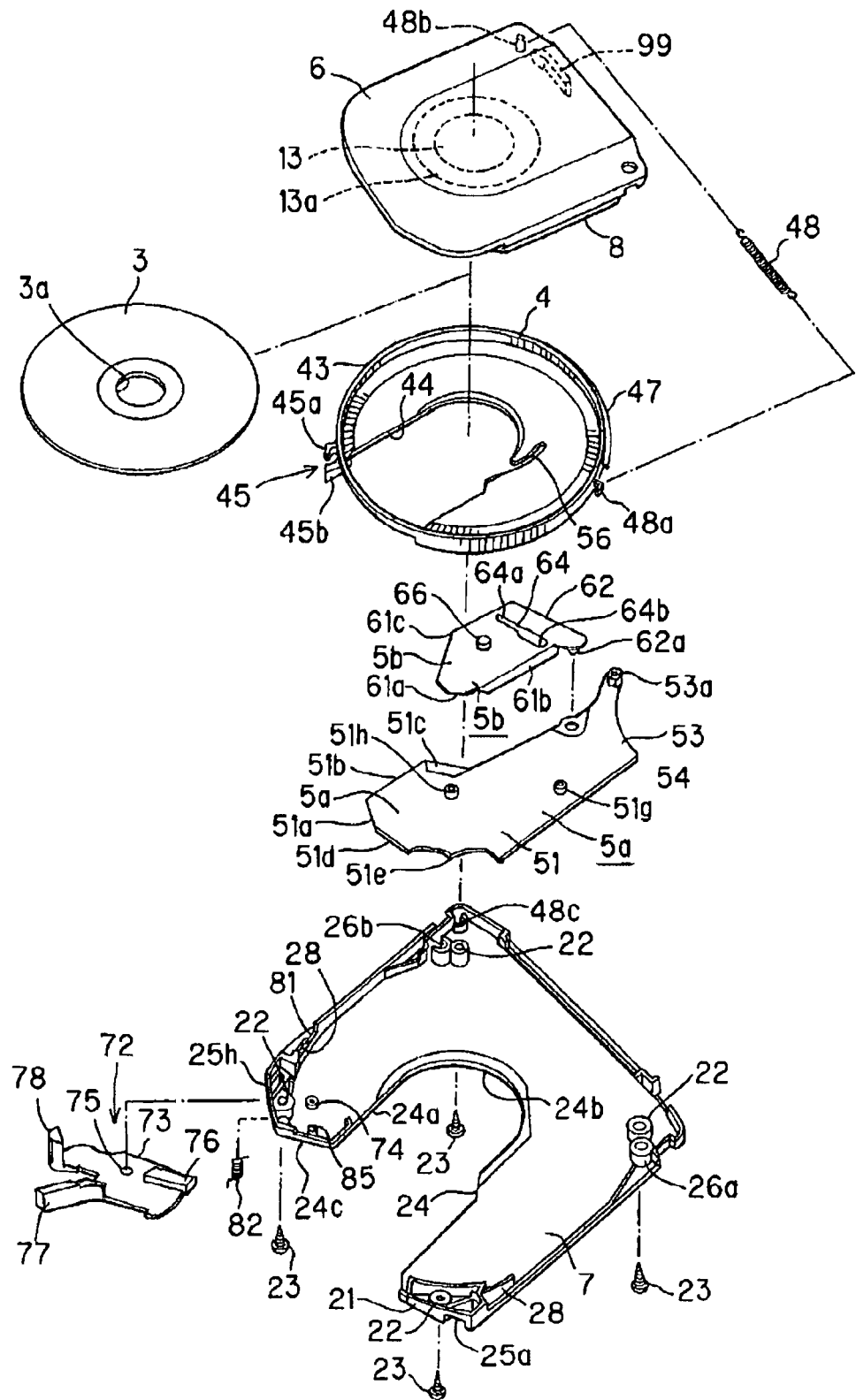
FIG. 3 is an exploded perspective view of the cartridge.

As shown in FIGS. 1 to 3, the disc cartridge 1 to which the present invention is applied accommodates a rotation wheel 4, in which an optical disc 3 is accommodated, and a pair of shutter plates 5a, 5b acting as a shutter mechanism in a cartridge main body 2. The cartridge main body 2 is composed of an upper shell 6 and a lower shell 7 abutted against and combined with each other.

The optical disc 3 used to the disc cartridge 1 has a center hole 3a formed at a center so that a disc rotation drive mechanism on a recording and/or replaying device side is engaged with the optical disc 3 therethrough. Note that the optical disc 3 may be an replay only optical disc in which a pit pattern corresponding to information signals to be recorded is formed on a disc substrate or may be a rewritable optical disc using a phase-changing material to a recording layer, and further may be a write once optical disc using an organic pigment material and the like to a recording layer. A recording medium to be used may be a magnet-optical disc, a magnetic disc and the like in addition to the optical disc. Further, a cleaning disc may be used in place of the recording medium.

Figure 4:
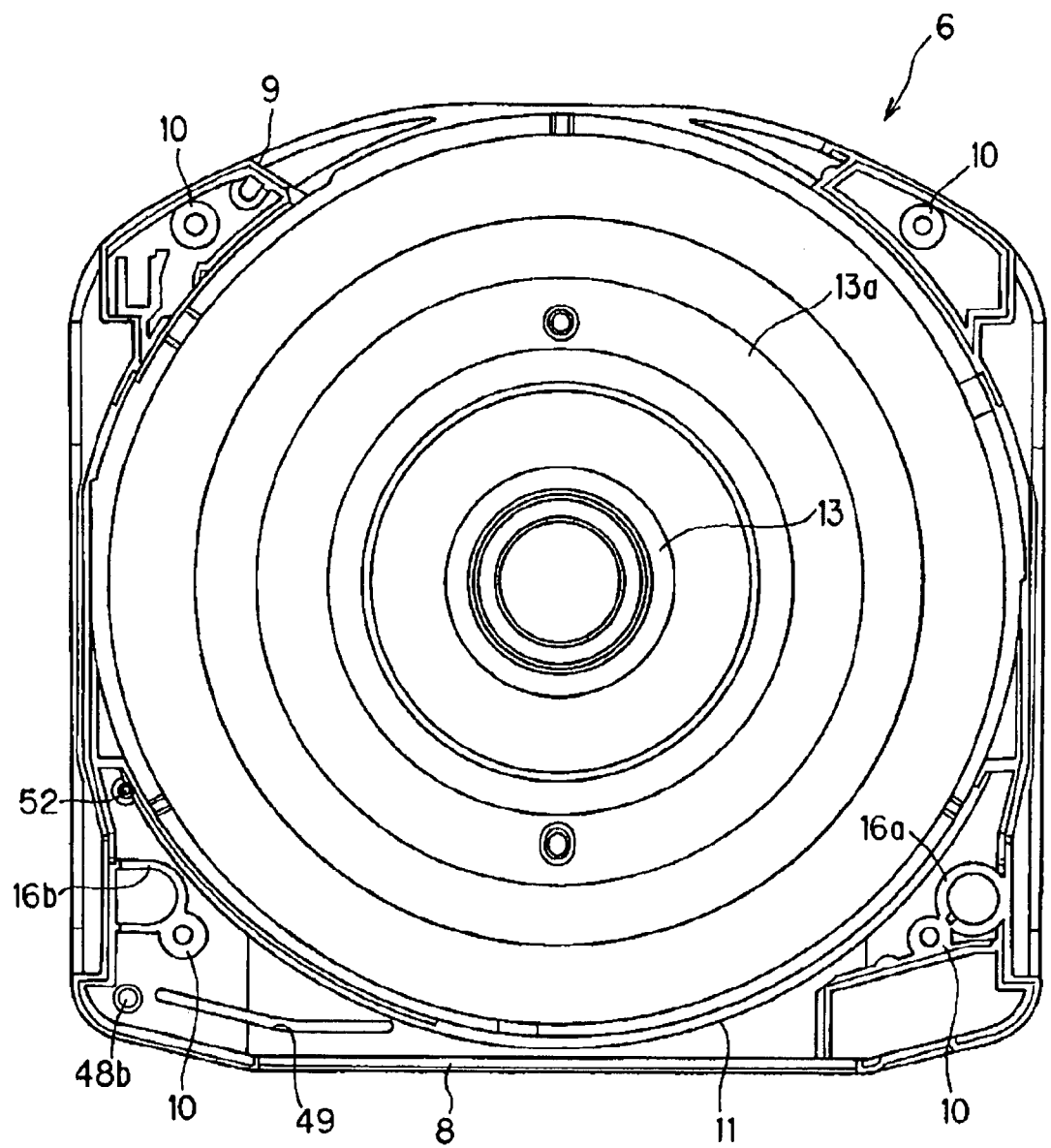
FIG. 4 is a plan view of an upper shell constituting the disc cartridge when viewed from the inner surface side thereof.

As shown in FIG. 4, the upper shell 6 constituting the cartridge main body 2 is formed by injection molding a resin material. In the main surface of the upper shell 6 formed to an approximately rectangular-shaped in its entirety, the front surface thereof which acts as an insertion edge to the recording and/or replaying device is formed to an approximately arc shape. Further, in the upper shell 6, an outer peripheral wall 8, which forms the side surface of the cartridge main body 2, is standingly formed along the outer peripheral edge of the main surface.

A pick-up entering recess 9 is formed to the outer peripheral wall 8 and to an inner peripheral wall 11 inscribing the outer peripheral wall 8 at a center of the front surface to cause an optical pick-up on the recording and/or replaying device side to enter thereinto. Further, a plurality of bosses 10, to which screw holes are formed, are formed to, for example, the vicinity of respective corners of the outer peripheral wall 8 to couple the lower shell 7 therethrough.

The inner peripheral wall 11 rotatably accommodates the rotation wheel 4 therein and acts as a guide wall when the rotation wheel 4 rotates. Further, when the rotation wheel 4 is accommodated, the main surface of the upper shell 6 constitutes a disc accommodating portion together with the rotation wheel 4.

A clamping plate 13 is attached to approximately the center of the inner surface of the upper shell 6 for clamping the optical disc 3 together with a disc table which constitutes a disc rotation drive unit on the recording and/or replaying device side. The clamping plate 13 is attached by an attachment ring 13a. Specifically, the clamping plate 13 is attached by fixing the attachment ring 13a to approximately the center of the inner surface of the upper shell 6 by soldering so as to clamp the clamping plate 13 between the attachment ring 13a and approximately the center of the inner surface of the upper shell 6. The optical disc 3 is placed in a rotatable state in the disc accommodating portion in such a manner that the disc table is engaged with the center hole 3a and further the optical disc 3 is clamped between the disc table and the clamping plate 13.

Note that a standing wall 16a constituting a location hole 26a of the lower shell 7 to be described later and a standing wall 16b constituting an alignment hole 26b thereof are further formed to the inner surface of the upper shell 6.

Figure 5:
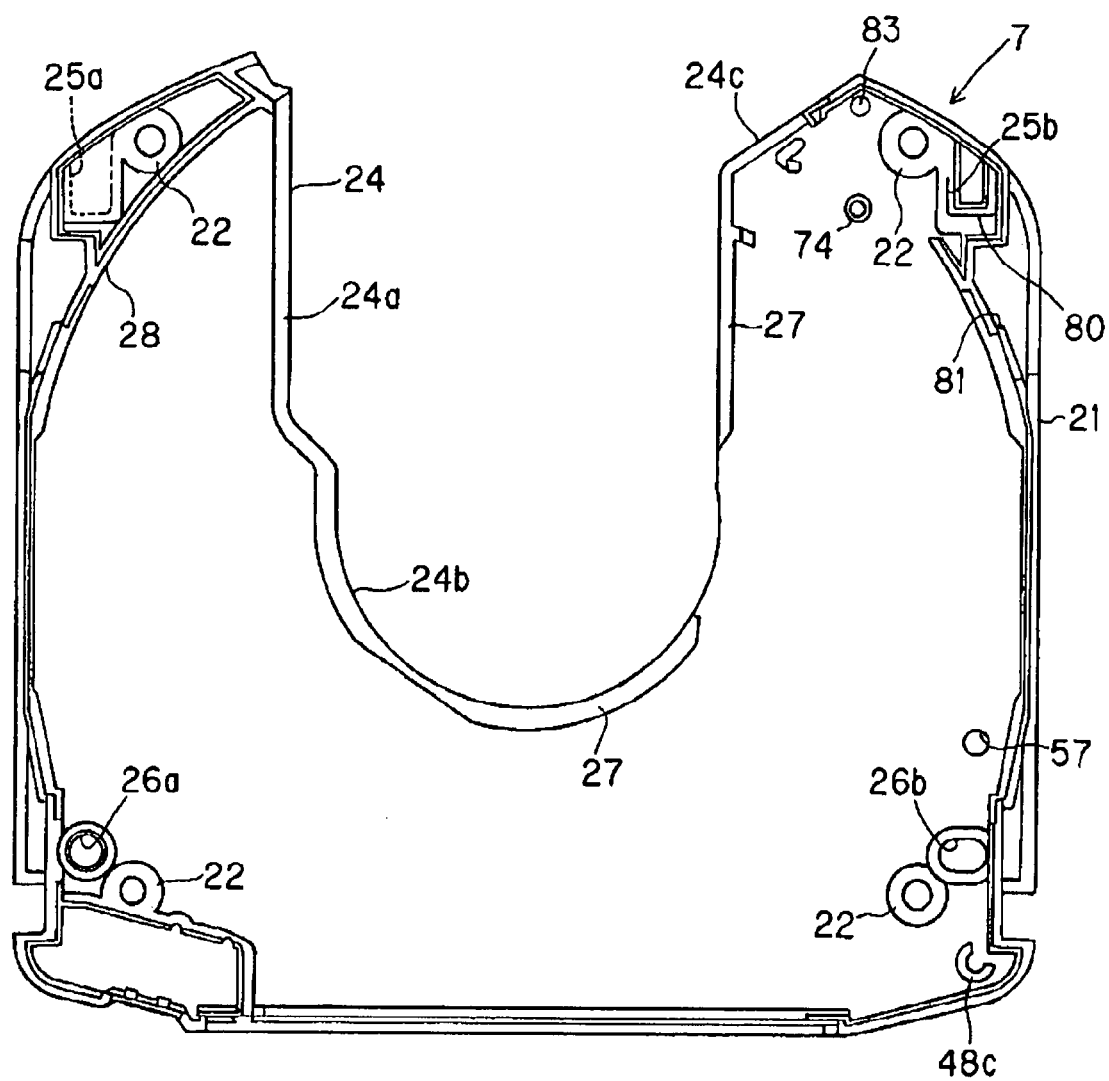
FIG. 5 is a plan view of a lower shell constituting the cartridge when viewed from the inner surface side thereof.

As shown in FIGS. 2, 3, and 5, the lower shell 7 to be coupled with the upper shell 6 arranged as described above is formed by injection molding a resin material likewise the upper shell 6. In the main surface of the lower shell 7 formed to an approximately rectangular-shaped in its entirety, the front surface side thereof which is inserted into the recording and/or replaying device is formed to an approximately arc shape. An outer peripheral wall which forms the side surface of the cartridge main body 2 is standingly disposed along the outer peripheral edge of the main surface of the lower shell 7, and further an inner periphery wall 28 is formed to inscribe the outer peripheral wall 21.

A first opening 24 is formed to a central portion of the front surface side of the outer peripheral wall 21 of the lower shell 7 so that an optical pickup and the disc table can enter therethrough. The first opening 24 is composed of an approximately rectangular-shaped opening 24a and a rotation drive opening 24b formed continuously to the opening 24a. The opening 24a faces a part of the signal recording surface of the optical disc 3 from an open edge on the front surface side to the outside throughout the inner and outer peripheries thereof, and the rotation drive opening 24b faces the center hole 3a of the optical disc 3 to the outside. That is, the opening 24a is formed to a size sufficient to cause the optical pickup of the recording and/or replaying device to enter into the cartridge main body 2, and the rotation drive opening 24b is formed to a size sufficient to cause the disc table which constitutes the disc rotation drive mechanism of the recording and/or replaying device to enter into the cartridge main body 2. Further, a taper portion 24c is formed to one opening edge of the opening 24a in a direction in which the opening edge of the opening 24b is widened. When the shutter plates 5a, 5b are located at positions where they release the first opening 24, the taper portion 24c acts as a portion in which a to-be-manipulated portion 45 of the rotation wheel 4 to be described later is accommodated.

A plurality of projections 27 are formed to one side edge of the opening 24a constituting the first opening 24 and to one side edge of the drive opening 24b to prevent dusts and the like from entering into the cartridge main body 2 when the pair of shutter plates 5a, 5b close the first opening 24.

Bosses 22 having through-holes formed thereinto are formed to the back surface side of the outer peripheral wall 21 so that they are abutted against the above bosses 10 which are disposed to the upper shell 6 and into which the screw holes are formed. As shown in FIG. 2, the upper shell 6 is coupled with the lower shell 7 by inserting screws 23 from the through-holes of the bosses 22 of the lower shell 7 and threading them with the screw holes of the bosses 10 of the upper shell 6.

Figure 6:
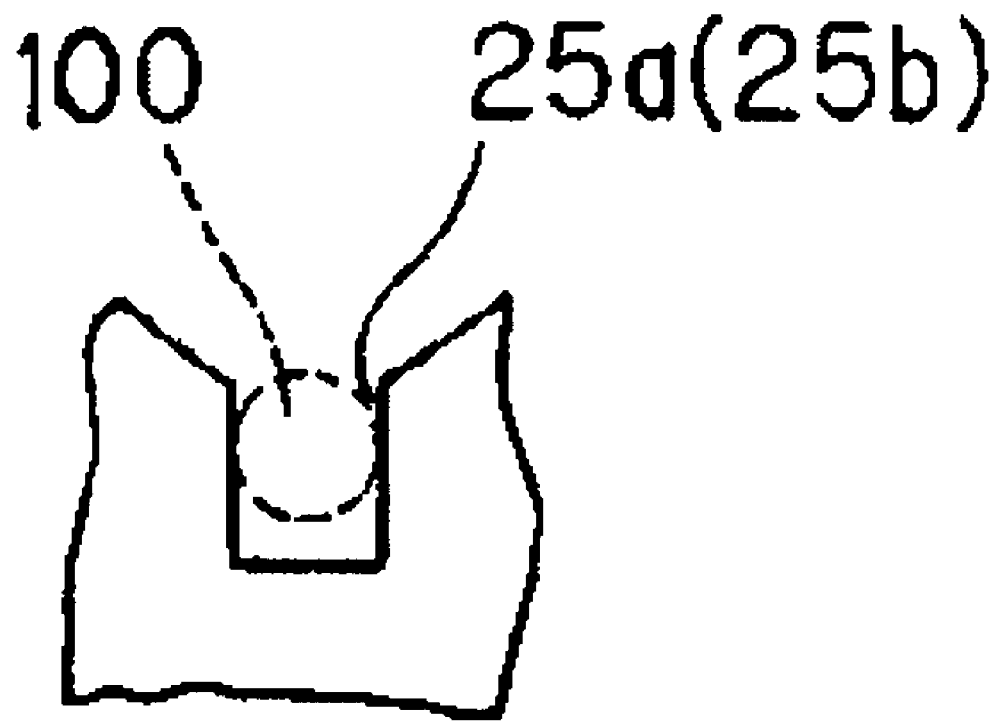
FIG. 6 is a plan view of a main portion showing the relation between an insertion guide groove and an insertion guide pin.

Further, insertion guide grooves 25a, 25b are formed to both the sides of the front surface of the lower shell 7 so that insertion guide pins 100, which act as insertion guide members when the disc cartridge 1 is inserted into the recording and/or replaying device, are engaged therewith. Specifically, as shown in FIG. 6, each of the insertion guide grooves 25a, 25b is a groove portion formed from the front surface of the cartridge main body 2 to the back surface thereof by opening a front surface acting as an insertion edge to the recording and/or replaying device and the bottom surface of the cartridge main body 2 composed of the lower shell 7. Further, the insertion guide grooves 25a, 25b are formed widest on the opening edge sides of the front surface so that insertion guide pins 100 can easily enter them.

At least the insertion guide groove 25a is formed as large as the diameter of the insertion guide pin 100 in its deepest portion to regulate the movement of the pin in an X-direction and a Y-direction that are orthogonal to each other on a mounting surface. Further, the other insertion guide groove 25b is formed slightly larger than the diameter of the insertion guide pin 100. When the insertion guide pin 100 is abutted against the deepest portion of the insertion guide groove 25b lightly larger than it, the insertion guide groove 25b regulates the guide pin 100 in a rotating direction on the mounting surface in cooperation with the insertion guide grooves 25a. Note that at least the deepest portion of the insertion guide groove 25b may be also formed as large as the diameter of the insertion guide pin 100 so that the disc cartridge 1 can be securely positioned at the mounting portion of the recording and/or replaying device. These insertion guide grooves 25a, 25b permit the disc cartridge 1 to be positioned at and mounted to the mounting portion of the recording and/or replaying device without using a location hole 26a and an alignment hole 26b to be described later.

The insertion guide groove 25a also acts as an identifying portion to an approximately similar-shaped disc cartridge with a different recording format and the like. When, for example, the disc cartridge 1 is used as a business-use disc cartridge used by a broadcast station and the like and a disc cartridge, which has approximately the same outside shape but has a different recording format and the like, is used as a consumer-use disc cartridge, the insertion guide groove 25a is formed only to the business-use the disc cartridge 1 and is not formed to the consumer-use disc cartridge. With this arrangement, a recording and/or replaying device for the business-use disc cartridge 1 can identify a type of a disc cartridge by the presence or absence of the insertion guide groove 25a. Further, when the consumer-use disc cartridge is inserted by mistake, the disc cartridge can be prevented from being erroneously inserted by the insertion guide pin 100 for the insertion guide groove 25a.

That is, the insertion guide groove 25a, 25b as described above are arranged as grooves having multi-functions, that is, the insertion guide function for a disc cartridge when it is inserted into the recording and/or replaying device, the identification function for identifying a disc cartridge which has the same outside shape and the size but has a different recording format, the positioning function at the mounting portion of the recording and/or replaying device, and the like.

As shown in FIGS. 2 and 5, the location hole 26a is formed in the vicinity of one corner of the lower shell 7 on the back surface side thereof to position and mount the disc cartridge 1 at and in the recording and/or replaying device. Further, the alignment hole 26 for adjustment is formed in the vicinity of the other corner of the lower shell 7.

Note that, as shown in FIGS. 1 and 2, guide grooves 15a, 15b are formed to the cartridge main body 2, which is composed of the upper shell 6 abutted against the lower shell 7, from the front surface side to the back surface side on both the sides thereof parallel to the direction in which the cartridge main body 2 is inserted into the recording and/or replaying device. These guide grooves 15a, 15b are used when the cartridge main body 2 is inserted into the recording and/or replaying device.

Figure 7:
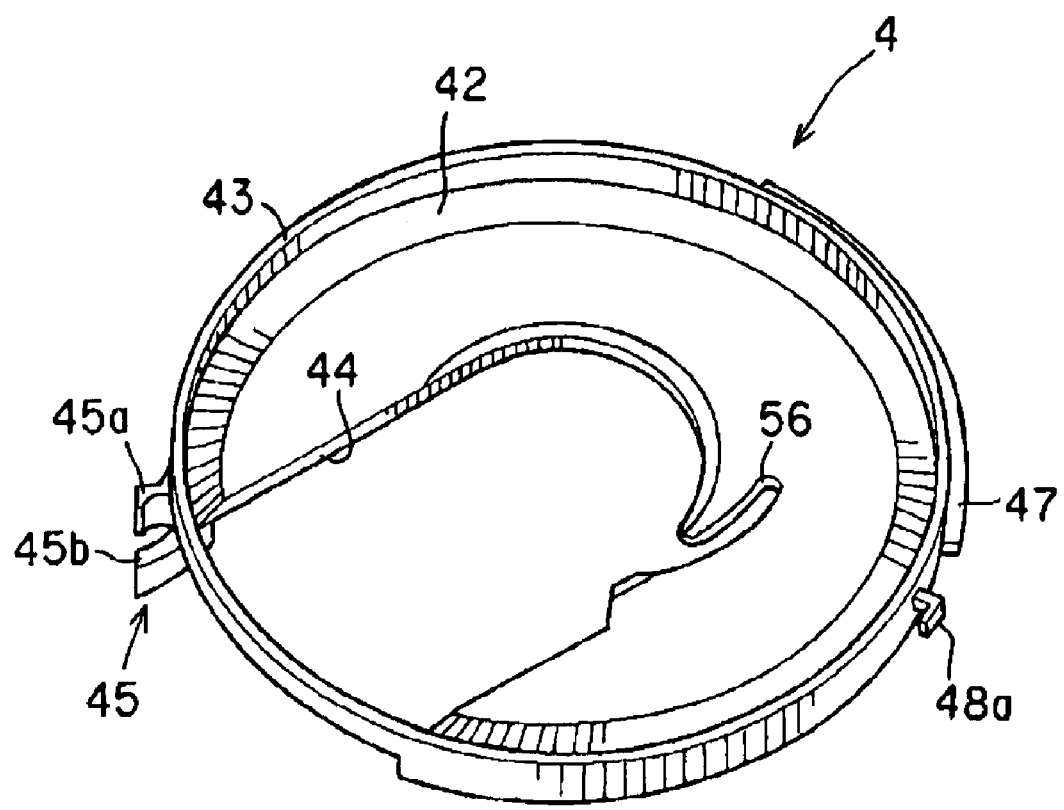
FIG. 7 is a perspective view of a rotation wheel when viewed from a surface side to which an optical disc is accommodated.
Figure 8:
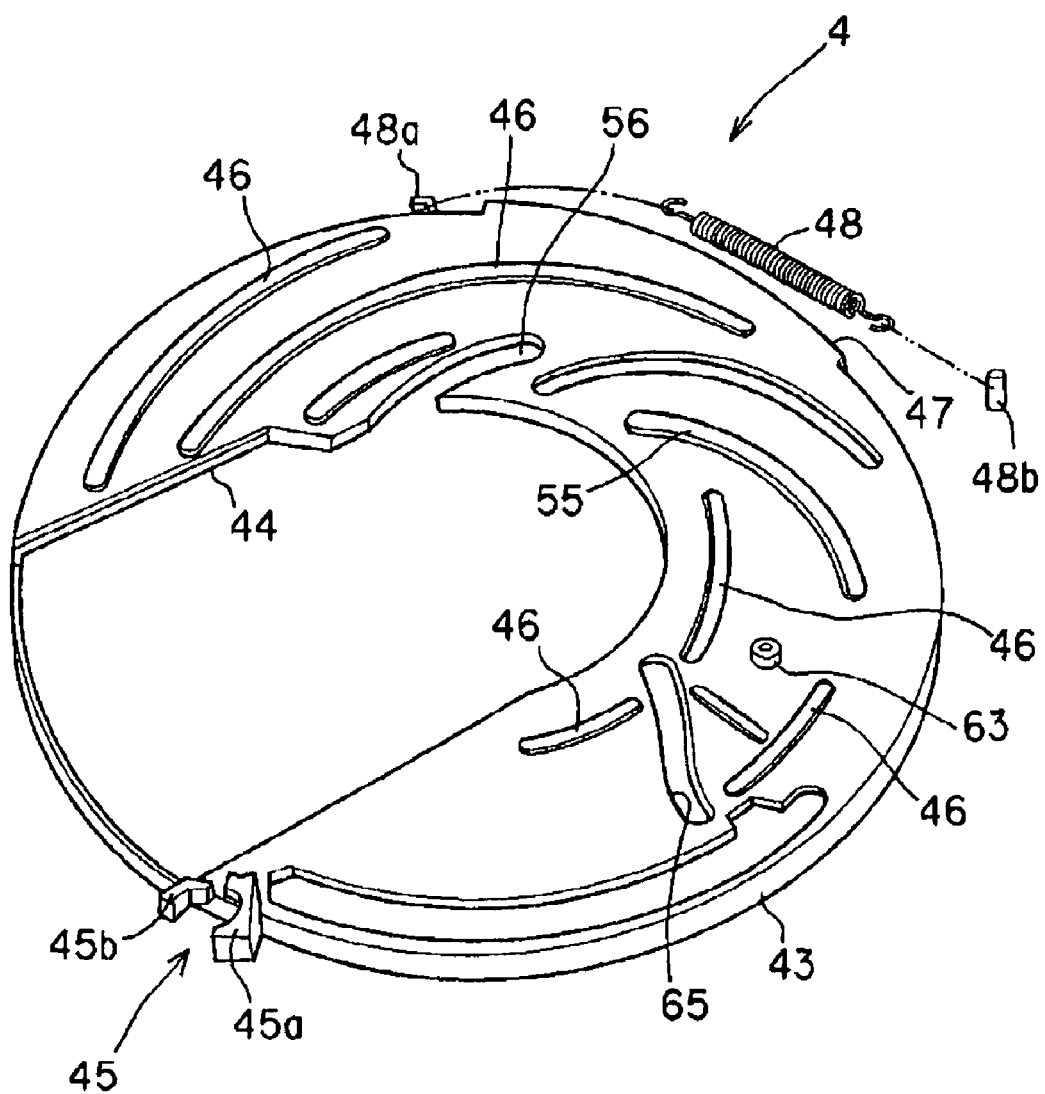
FIG. 8 is a perspective view of the rotation wheel when viewed from the surface thereof on the lower shell side.

When the upper shell 6 is abutted against the lower shell 7, an accommodating portion for accommodating the rotation wheel 4 is formed inward of inner peripheral wall 11. As shown in FIGS. 7 and 8, the rotation wheel 4 accommodated in the accommodating portion is formed by injection molding a resin material. The main surface of the rotation wheel 4 has an approximately plate-shape, and when the recessed side of the rotation wheel 4 is disposed in the cartridge main body 2, the disc accommodating portion is formed by the upper shell 6 and the main surface of one of the shutter plates 5a, 5b. The rotation wheel 4 is formed to an approximately circular shape, and a ring portion 43 is standingly disposed to the outer peripheral edge thereof. A second opening 44, which is approximately as large as the first opening 24 formed to the lower shell 7, is formed to the main surface of the rotation wheel 4.

When the second opening 44 coincides with the first opening 24 of the lower shell 7, it causes the accommodated optical disc 3 to face to the outside. That is, the second opening 44 is formed of an opening corresponding to the opening 24a of the first opening 24 and an opening corresponding to the rotation drive opening 24b thereof.

Further, as shown in FIG. 7, the ring portion 43 has a taper portion 42 formed to the base edge thereof, and the taper portion 42 inclines to the main surface side of the ring portion 43. The taper portion 42 supports the outer peripheral edge of the optical disc 3 in line contact therewith to prevent the signal recording surface of the optical disc 3 from being scratched by coming into surface contact with the main surface of the rotation wheel 4.

As shown in FIGS. 7 and 8, the to-be-manipulated portion 45 is formed in the vicinity of the second opening 44 of the rotation wheel 4. The to-be-manipulated portion 45 projects to the outside, a shutter release pin 41, which constitutes a shutter release member of a shutter release mechanism on the recording and/or replaying device side is engaged with the to-be-manipulated portion 45. The to-be-manipulated portion 45 has first and second to-be-manipulated pieces 45a, 45b, and they form a recessed portion whose recording and/or replaying device side is opened. The shutter release pin 41 on the recording and/or replaying device side is engaged with the recessed portion. As the rotation wheel 4 rotates, the to-be-manipulated portion 45 is exposed to the outside from the front surface of the lower shell 7 to which the first opening is formed and moves in the width direction of the first opening 24. When the shutter plates 5a, 5b release the first opening 24, the to-be-manipulated portion 45 is located at a portion whose width is increased by the taper portion 24c.

Further, the pair of shutter plates 5a, 5b is interposed between the rotation wheel 4 and the lower shell 7. As shown in FIG. 8, a plurality of projections 46 are formed on the surface of the rotation wheel 4 on which the shutter plates 5a, 5b are disposed to reduce a sliding resistance by reducing the contact area of the surface with the shutter plates 5a, 5b. The projections 46 are formed to project, for example, about 20 μm.

As shown in FIG. 8, in the rotation wheel 4 arranged as described above, the shutter plates 5a, 5b are turningly urged by an urging member 48 composed a coil spring and the like in a direction in which the first and second openings 24, 44 are closed. The urging member 48 has an end locked to a locking piece 48a formed to the ring portion 43 of the rotation wheel 4 and the other end locked to a locking projection 48b formed to the inner surface the upper shell 6 shown in FIG. 4. Although the urging member 48 is extended and contracted as the rotation wheel 4 rotates, since the urging member 48 is guided by a guide groove 49 formed of a standing wall that is formed on the inner surface of the upper shell 6 outside of the inner peripheral wall 11, it is prevented from running out of control in the cartridge main body 2 when it is extended and contracted. Further, as shown in FIGS. 7 and 8, a flange portion 47 is also formed to the outer peripheral edge of the rotation wheel 4 to approximately close the guide groove 49.

In the rotation wheel 4 arranged as described above, the shutter plates 5a, 5b are urged by the urging member 48 in the direction in which the first and second openings 24, 44 are closed, and the to-be-manipulated portion 45 is rotated by the shutter release pin 41 on the recording and/or replaying device side in the direction in which the shutter plates 5a, 5b release the first and second openings 24, 44. At the time, the inner peripheral wall 11 acts as the guide wall when the rotation wheel 4 rotates.

Figure 9:
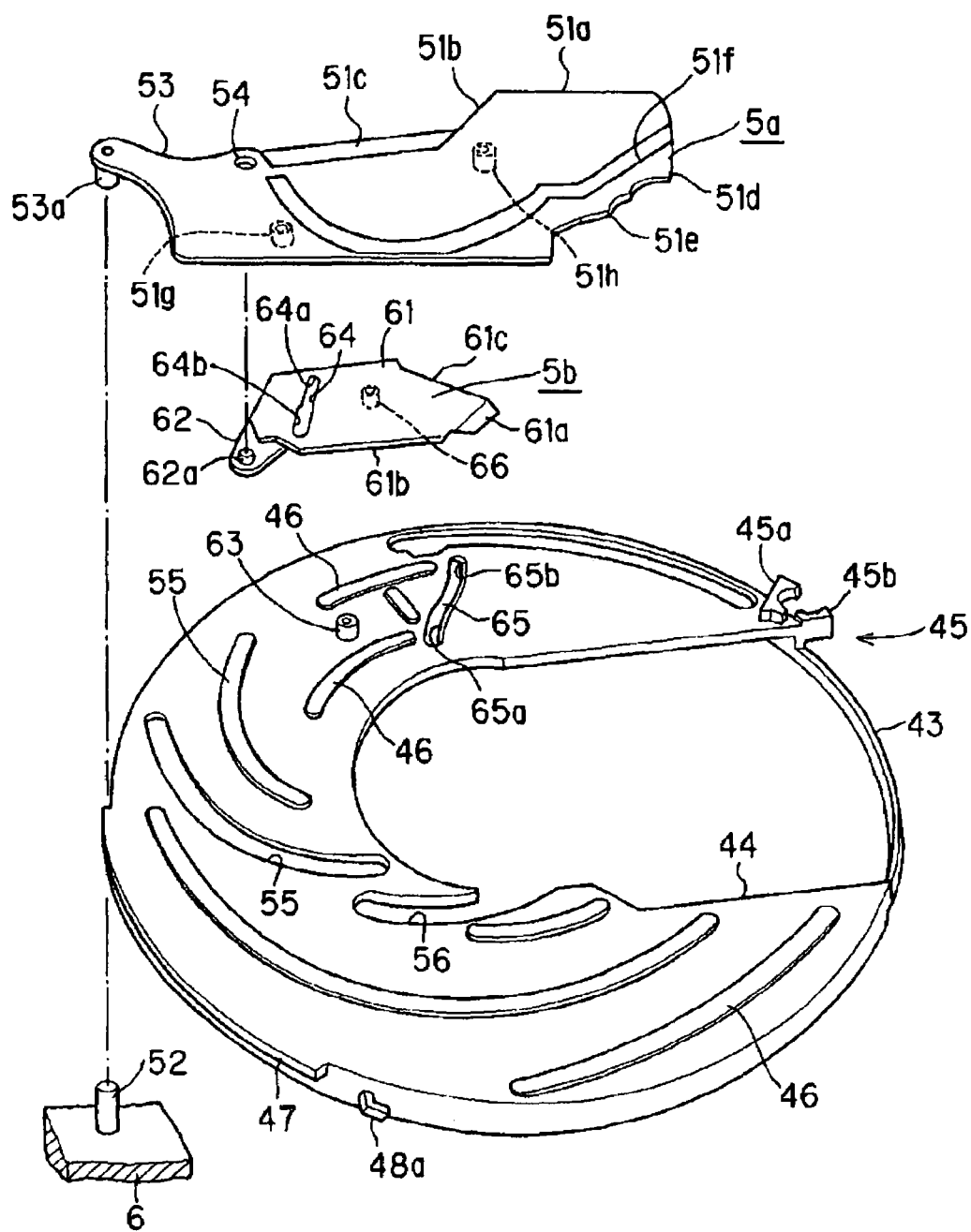
FIG. 9 is a perspective view showing shutter plates and the rotation wheel.

In the pair of shutter plates 5a, 5b that constitute the shutter mechanism for opening and closing the first opening 24 formed to the lower shell 7 and the second opening 44 formed to the rotation wheel 4, the shutter plate 5a is formed larger than the shutter 5b as shown in FIG. 9.

As shown in FIG. 9, the first larger shutter plate 5a includes a first shutter portion 51 for closing the first and second opening 24, 44, a first turning support portion 53 turningly supported by a first support shaft 52 formed on the inner surface of the upper shell 6 between the outer periphery wall 8 and the inner peripheral wall 11, and a second shaft hole 54 to which the second smaller shutter plate 5b is attached.

The first shutter portion 51 includes a first side edge 51a located at one side edge of the second opening 44 of the rotation wheel 4 when the second opening 44 is closed, a second side edge 51b formed continuously to the first side edge 51a, and a third side edge 51c formed continuously to the second side edge 51b. The second side edge 51b is formed to bend inwardly of the first side edge 51a, and the third side edge 51c is formed to bend outward of the second side edge 51b. Further, a fourth side edge 51d confronting the first to third side edges 51a to 51c has a wave-shaped escape portion 51e formed thereto to escape the bosses 10, 22 formed to the one corners of the upper and lower shells 6, 7, the location hole 26a, a write error preventing portion, and the like.

Further, the first shutter portion 51 has a groove 51f formed on the surface thereof on the lower shell 7 side. The groove 51f is engaged with the projections 27 formed to the peripheral edge of the first opening 24 of the lower shell 7. When the shutter plates 5a, 5b close the first and second openings 24, 44, the groove 51f is engaged with the projections 27 formed to the peripheral edge of the first opening 24 to thereby prevent dusts and the like from entering the cartridge main body 2.

Further, the first shutter portion 51 has a guide projection 51g formed to the surface thereof on the optical disc 3 side. The guide projection 51g is engaged with a guide groove 55 formed to the main surface of the rotation wheel 4 to thereby regulate the turn of the first shutter plate 5a. Further, a regulating projection 51h is formed to the surface of the first shutter portion 51 on the optical disc 3 side thereof to regulate the displacement of the shutter plate 5a. When the shutter plates 5a, 5b close the first and second openings 24, 44, the regulating projection 51h is disposed at a position corresponding to an inner peripheral side non-signal recording region around the center hole 3a of the optical disc 3. Accordingly, even if the first shutter plate 5a is depressed and displaced inward, a signal recording region of the optical disc 3 is not scratched. When the shutter plates 5a, 5b release the first and second openings 24, 44, the regulating projection 51h enters an escape groove 56 formed to a position of the rotation wheel 4 near to the center thereof so that it does not interfere with the turn of the shutter plate 5a.

A first shaft hole 53a is formed to the first turning support portion 53 of the shutter plate 5a so that the first support shaft 52 formed to the upper shell 6 is inserted thereinto.

As shown in FIG. 9, the second shutter plate 5b engaged with the first shutter plate 5a includes a second shutter portion 61 for closing the first and second openings 24, 44 together with the first shutter portion 51 and a second turn support portion 62 attached to the second shaft hole 54 formed to the first shutter plate 5a.

The second shutter portion 61 includes a first side edge 61a engaged with the second side edge 51b of the first shutter portion 51, a second side edge 61b formed continuously to the first side edge 61a and engaged with the third side edge 51c of the first shutter portion 51, and a third side edge 61c continuous to the first side edge 61a on a side opposite to the second side edge 61b. When the shutter plates 5a, 5b close the first and second openings 24, 44, the second side edge 51b of the first shutter portion 51 is meshed with the first side edge 61a of the second shutter portion 61, and further the third side edge 51c of the first shutter portion 51 is meshed with the second side edge 61b of the second shutter portion 61. Accordingly, when the pair of shutter plates 5a, 5b closes the first and second openings 24, 44, the shutter plates 5a, 5b are meshed with each other to thereby prevent dusts and the like from entering from a coupling portion as well as make the shutter plates 5a, 5b unlike to flex when they are depressed.

Further, a first cam portion 64 is formed to the second shutter portion 61 and composed of a groove with which a first control projection 63 formed to the rotation wheel 4 is engaged. The first cam portion 64 is meshed with the first control projection 63 to thereby control the turn of the second shutter plate 5b. The first cam portion 64 is composed of a narrow portion 64a on the outer peripheral side of the rotation wheel 4 and a wide portion 64b located near to the center of the rotation wheel 4 and made wider than the narrow portion 64a. The narrow portion 64a acts as a first acting portion for turning the second shutter plate 5b in the former half portion when the second shutter plate 5b releases the first and second openings 24, 44, and the wide portion 64b acts as a first non-acting portion that carries out no action when the first control projection 63 moves to the wide portion 64b, that is, in a latter half portion when the second shutter plate 5b releases the first and second openings 24, 44. Accordingly, the narrow portion 64a turns the second shutter plate 5 in the former half portion when the second shutter plate 5b releases the first and second openings 24, 44 and carries out no action to the second shutter plate 5b when the first control projection 63 moves to the wide portion 64b. Note that each of the first acting portion and the first non-acting portion may be formed of a curved groove similar to the second cam portion, in addition to that it is formed of a straight groove.

Further, the second shutter portion 61 has a second control projection 66 formed thereto. The second control projection 66 is engaged with a second cam portion 65 composed of a groove formed on the main surface of the rotation wheel 4. The second cam portion 65 is composed of a first curved portion 65a curved in a first direction on the center side of the rotation wheel 4 and a second curved portion 65b curved in a second direction opposite to the first curved portion 65a on the outer peripheral side of the rotation wheel 4. The first curved portion 65a acts as a second non-acting portion that carries out no action in the former half portion when the second shutter plate 5b releases the first and second openings 24, 44, and the second curved portion 65b acts as a second acting portion that carries out an action in the latter half portion when the second shutter plate 5b releases the first and second openings 24, 44. Accordingly, the first curved portion 65a carries out no action in the former half portion when the second shutter plate 5b releases the first and second openings 24, 44, and the second curved portion 65b turns the second shutter plate 5b in place of the narrow portion 64a of the first cam portion 64 described above when the second control projection 66 moves to the second curved portion 65b, that is, in the latter half portion of the turn of the second shutter plate 5b. As described above, since the different acting portions are employed when the second shutter plate 5b releases the first and second openings 24, 44, occurrence of dusts and the like due to wear can be prevented.

Note that the first and second acting portions and the first and second non-acting portions described above may be composed of any combination of the wide portion, the barrow portion, and further the curved portion.

A second support shaft 62a is formed to the second turn support portion 62 and inserted into the second shaft hole 54 formed to the first turning support portion 53 of the first shutter plate 5a. Accordingly, the second shutter plate 5b turns with respect to the first shutter plate 5 in place of turning with respect to the rotation wheel 4.

Figure 10:
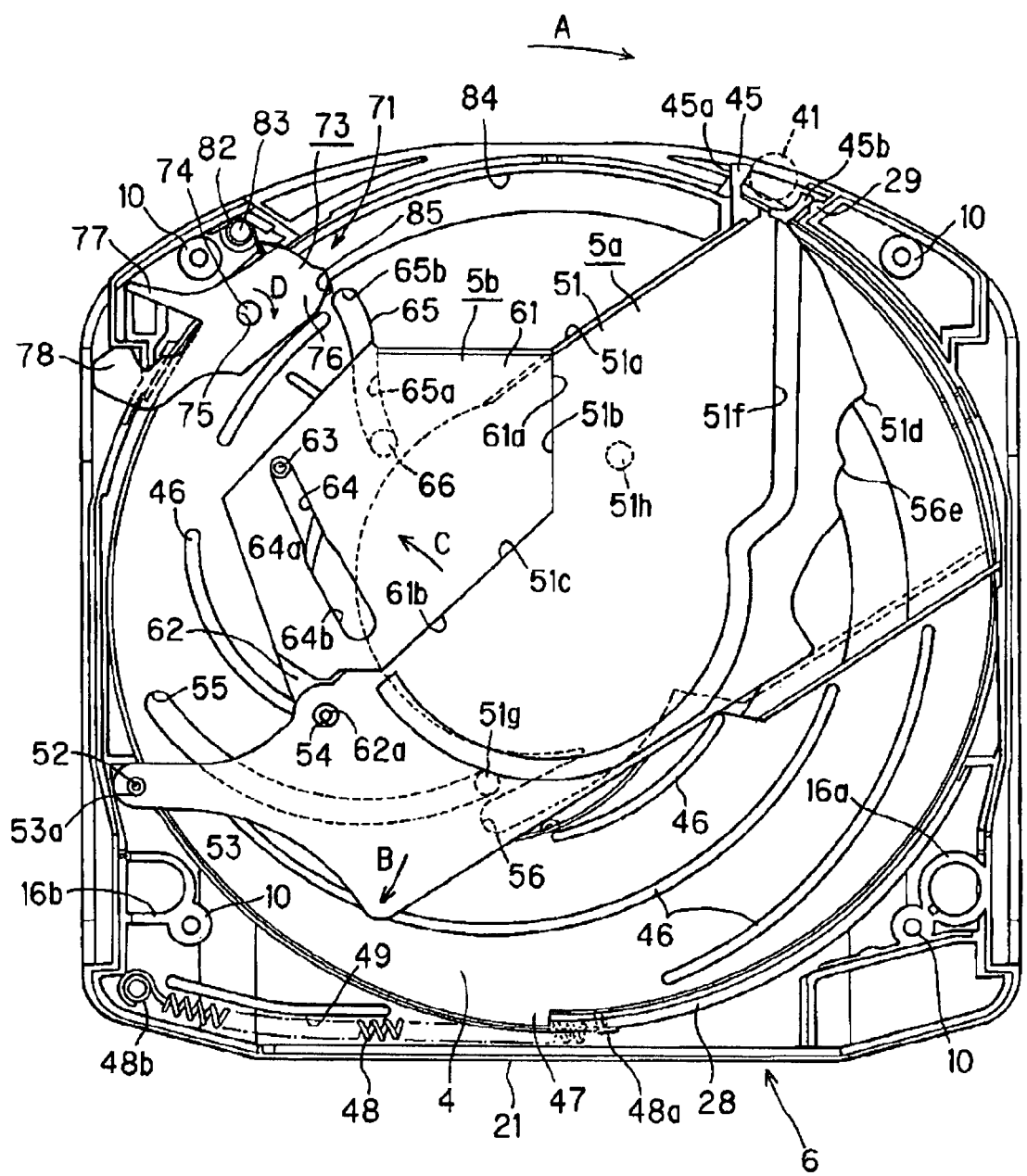
FIG. 10 is a plan view showing a state that the shutter plates close an opening excluding the lower shell and the optical disc.

Next, the rotation of the rotation wheel 4 and the operation of the pair of shutter plates 5a, 5b will be explained referring to FIGS. 10 and 11. FIG. 10 shows a state that the pair of shutter plates 5a, 5b closes the first and second openings 24, 44. When the pair of shutter plates 5a, 5b closes the first and second openings 24, 44, the rotation wheel 4 is turningly urged by the urging force of the urging member 48 in the direction of an arrow A in FIG. 10, and the to-be-manipulated portion 45 is located at one side edge of the first opening 24. The second side edge 51b of the first shutter portion 51 is meshed with the first side edge 61a of the second shutter portion 61, and further the third side edge 51c of the first shutter portion 51 is meshed with the second side edge 61b of the second shutter portion 61, thereby dusts and the like are prevented from entering inward from the coupling portion as well as the shutter plates 5a, 5b are made unlike to flex when they are depressed.

At the time, the guide projection 51g of the first shutter plate 5a is located at an edge of the guide groove 55 of the rotation wheel 4 near to the center thereof. The first control projection 63 is engaged with the narrow portion 64a, which acts the first acting portion, of the first cam portion 64 of the second shutter plate 5b. Further, the second control projection 66 of the second shutter plate 5b is engaged with the first curved portion 65a, which acts as the second non-acting portion, of the second cam portion 65 of the rotation wheel 4.

When the rotation wheel 4 is rotated by the to-be-manipulated portion 45 in a direction opposite to the direction of the arrow A in FIG. 10 against the urging force of the urging member 48, the first shutter plate 5a whose guide projection 51g is engaged with the guide groove 55 of the rotation wheel 4 is turned about the first support shaft 52 of the upper shell 6 in the direction of an arrow B of FIG. 10. As the first shutter plate 5a turns, the second shutter plate 5b is turned about the second support shaft 62a of the first shutter plate 5a in the direction of an arrow C with respect to the first shutter plate 5a. When the second shutter plate 5b begins to turn, it is turned by the narrow portion 64a of the first cam portion 64 which acts as the first acting portion with which the first control projection 63 of the rotation wheel 4 is engaged. Note that when the second shutter plate 5b begins to turn, the first curved portion 65a of the second cam portion 65 of the rotation wheel 4 with which the second control projection 66 of the second shutter plate 5b is engaged acts as the second non-acting portion and carries out no action.

Figure 11:
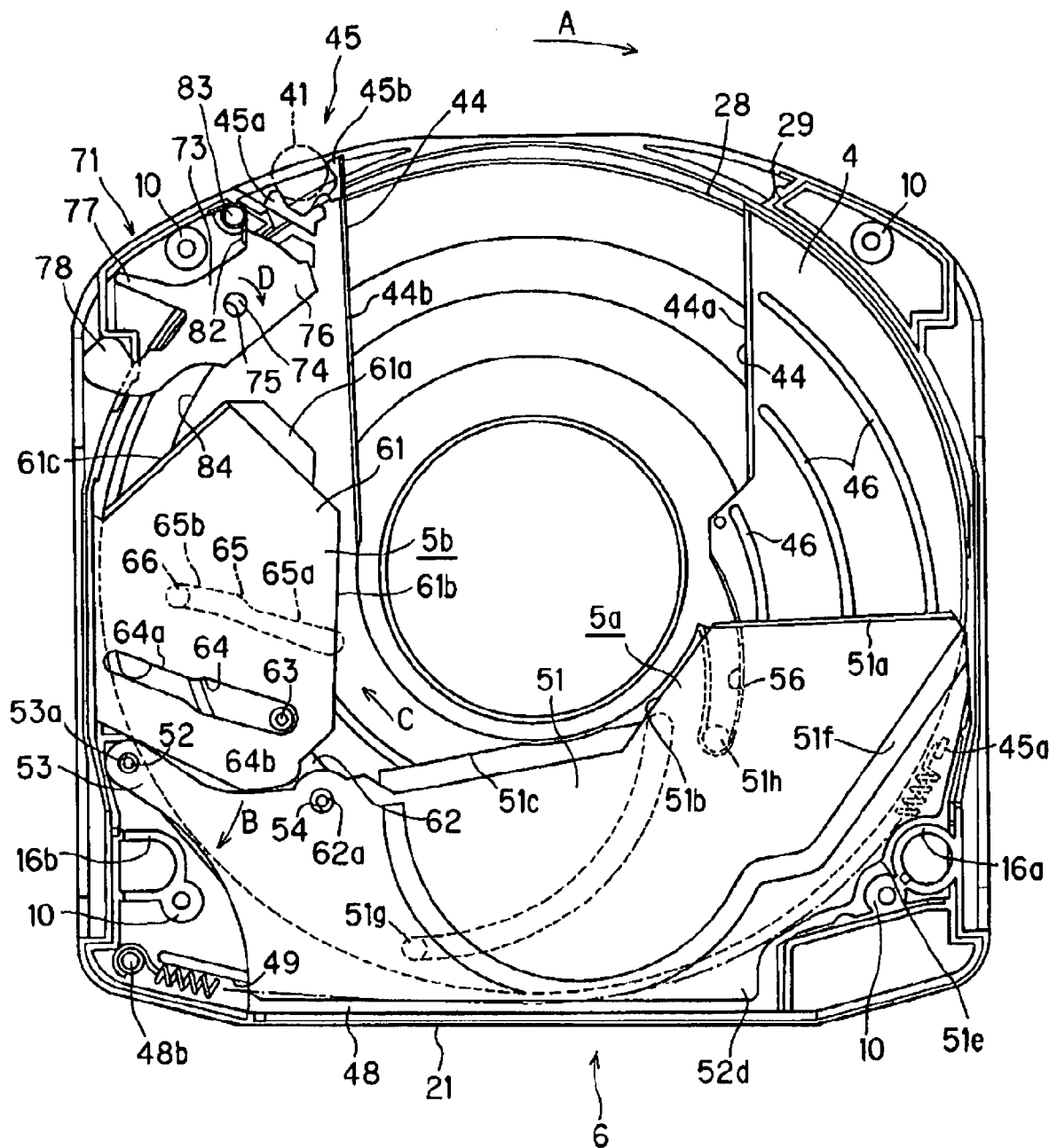
FIG. 11 is a plan view showing a state that the shutter plates release the opening excluding the lower shell and the optical disc.

Further, when the rotation wheel 4 turns in the direction opposite to the direction of the arrow A, the guide projection 51g engaged with the guide groove 55 of the rotation wheel 4 moves to the other end of the guide groove 55 on the outer peripheral side of the rotation wheel 4 as shown in FIG. 11. As the first shutter plate 5a turns, the second shutter plate 5b is turned about the second support shaft 62a of the first shutter plate 5a in the direction of the arrow C in FIG. 10 with respect to the first shutter plate 5a. Thus, the first control projection 63 of the rotation wheel 4 moves to the wide portion 64b of the first cam portion 64 that acts as the first non-acting portion and carries out no action to the second shutter plate 5b. In place of it, the second control projection 66 of the second shutter plate 5b moves from the first curved portion 65a acting as the second non-acting portion to the second curved portion 65b acting as the second acting portion and turns the second shutter plate 5b in the direction of the arrow C. With this operation, the first and second openings 24, 44 are released, thereby the optical disc 3 accommodated in the rotation wheel 4 can be faced to the outside throughout the inner and outer peripheries thereof as shown in FIG. 11.

Figure 12:
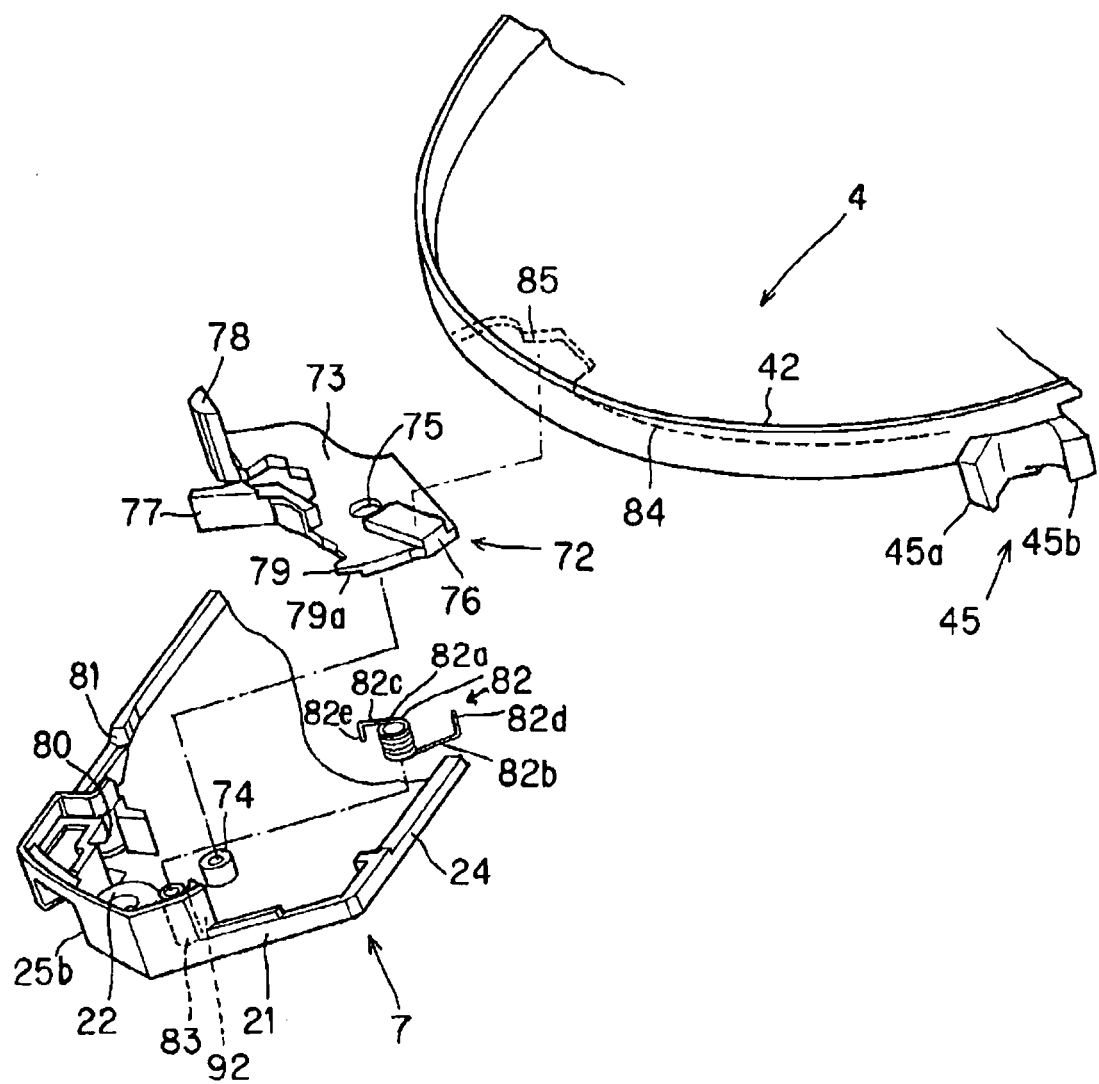
FIG. 12 is an exploded perspective view of a locking mechanism.

Incidentally, as shown in FIGS. 10 and 11, a locking mechanism 71 is disposed in the cartridge main body 2 to regulate the rotation of the rotation wheel 4. The locking mechanism 71 maintains the state that the shutter plates 5a, 5b close the second opening 24, 44 by regulating the rotation of the rotation wheel 4. Specifically, as shown in FIG. 12, the locking mechanism 71 includes a locking member 72 for locking the rotation wheel 4. The locking member 72 has a base member 73 and is formed of an elastic material excellent in a sliding property, for example, a polyacetal resin in its entirety. A shaft hole 75 is formed to the base member 73, and a support shaft 74 formed to the inner surface of the lower shell 7 is inserted into the shaft hole 75. Further, the base member 73 includes a locking portion 76 for locking the turn of the rotation wheel 4, a first unlocking piece 77 which is depressed by the insertion guide pin 100 on the recording and/or replaying device side which also acts as an unlocking pin, a second unlocking piece 78 which is depressed by a cartridge holding piece 101 on the recording and/or replaying device side, and a locking piece 79 to which an end of the urging member is locked. The locking member 72 is disposed in the vicinity of the insertion guide groove 25b on the side of the alignment hole 26b formed to the back surface side of the lower shell 7. The locking member 72 is attached to the lower shell 7 by inserting the support shaft 74 of the lower shell 7 into the shaft hole 75.

As shown in FIG. 12, the locking member 72 is turnably attached by inserting the support shaft 74 of the lower shell 7 into the shaft hole 75. At the time, the locking portion 76 faces inward, that is, faces the outer periphery of the rotation wheel 4, the first unlocking piece 77 is faced to the insertion guide groove 25b through an escape hole 80 formed to a standing wall constituting the insertion guide groove 25b, and the second unlocking piece 78 is faced to the outside by a cutout portion 81 formed to a guide groove 15b of the cartridge main body 2.

An attachment pin 83 is further formed in the vicinity of the support shaft 74 to which the locking member 72 is attached, and an urging member 82 such as a twisted coil spring and the like is attached to the attachment pin 83 to urge the locking member 72 in one direction. The urging member 82 is composed of a coil portion 82a having a first arm 82b and a second arm 82c formed on both the sides of the coil portion 82a. The first and second arms 82b, 82c are bent about 90° in an opposite direction so that the extreme ends thereof face an opposite direction, and the first and second arms 82b, 82c and arranged as first and second locking portion 82d, 82e. The urging member 82 arranged as described above urges the first and second arms 82b, the 82c in an open direction in which they are separated from each other. The coil portion 82a of the urging member 82 is windingly fitted on the attachment pin 83. In the urging member 82 attached to the attachment pin 83, a first locking portion 82d of the first arm 82b on one hand is locked to a locking piece 79 of the locking member 72, a second locking portion 82e of the second arm 82c on the other hand is locked in the vicinity of the boss 22 of the lower shell 7, thereby the locking member 72 is urged in the direction of an arrow D in FIG. 10 in which it is placed in a locked state such that the first unlocking piece 77 is located at the opening edge sides of the insertion guide grooves 25b, and the second unlocking piece 78 faces the cutout portion 81 of the guide groove 15b. Note that the locking piece 79 is formed of a thin-wall portion 79a so that the first arm 82b of the urging member 82 extends between it and the inner surface of the lower shell 7.

Figure 13:
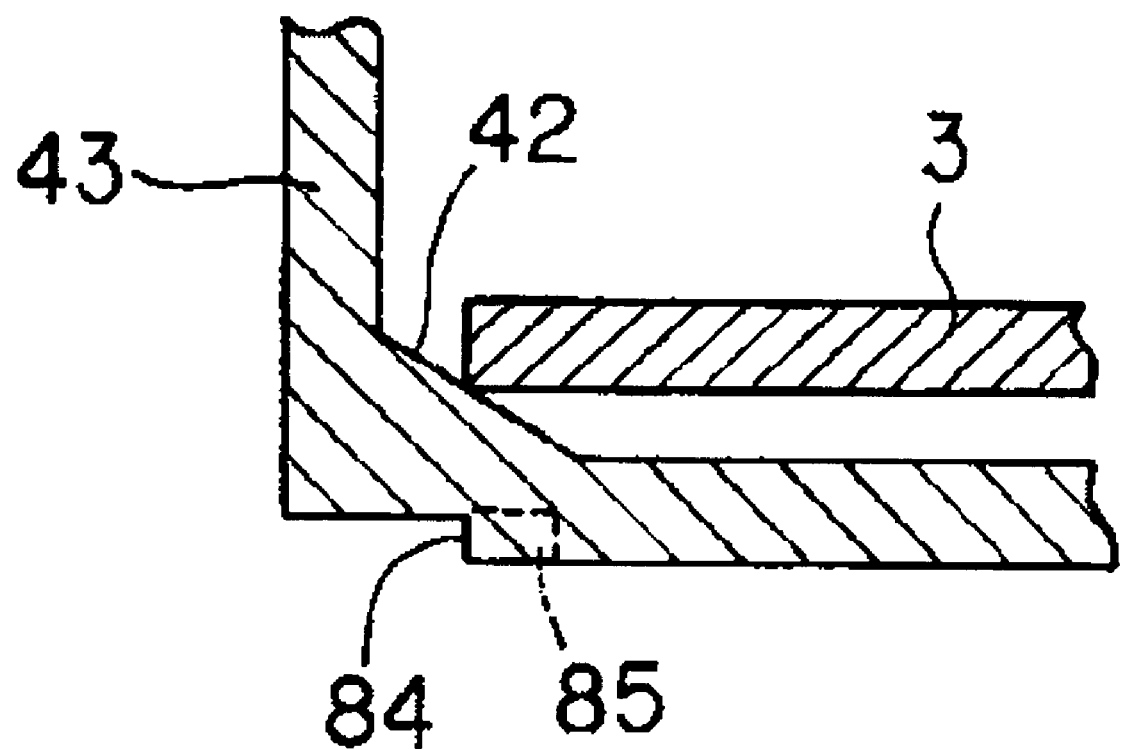
FIG. 13 is a sectional view of a main portion of the rotation wheel showing the relation between a taper portion of the rotation wheel and a locking groove.

The locking portion 76 of the base member 73 is located slightly inward of the outer periphery of the rotation wheel 4. A locking groove 84 is formed to the rotation wheel 4 at a position slightly inward of the outer periphery thereof, and the locking portion 76 projecting from the base member 73 is engaged with the locking groove 84. An engaging recess 85 is formed thereof the inside of the locking groove 84. The locking portion 76 locks the rotation of the rotation wheel 4 by being engaged with the engaging recess 85. As shown in FIG. 13, the locking groove 84 is formed on the surface of the rotation wheel 4, in which the optical disc 3 is accommodated, below the taper portion 42 formed to the base end portion of the ring portion 43 to support the outer peripheral edge of the optical disc 3, thereby formation of an unnecessary thick-wall portion is eliminated.

Figure 14:
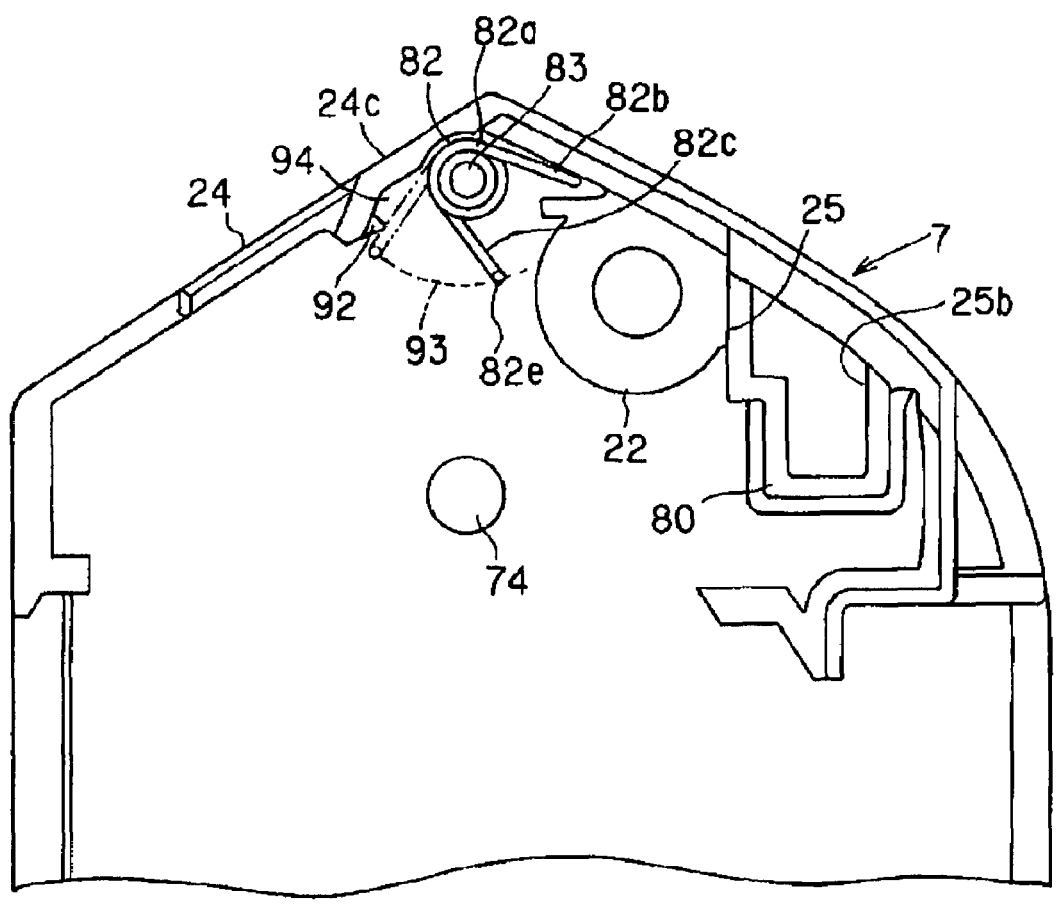
FIG. 14 is a plan view of a main portion of the lower shell showing how an urging member is attached to the locking mechanism.
Figure 15:
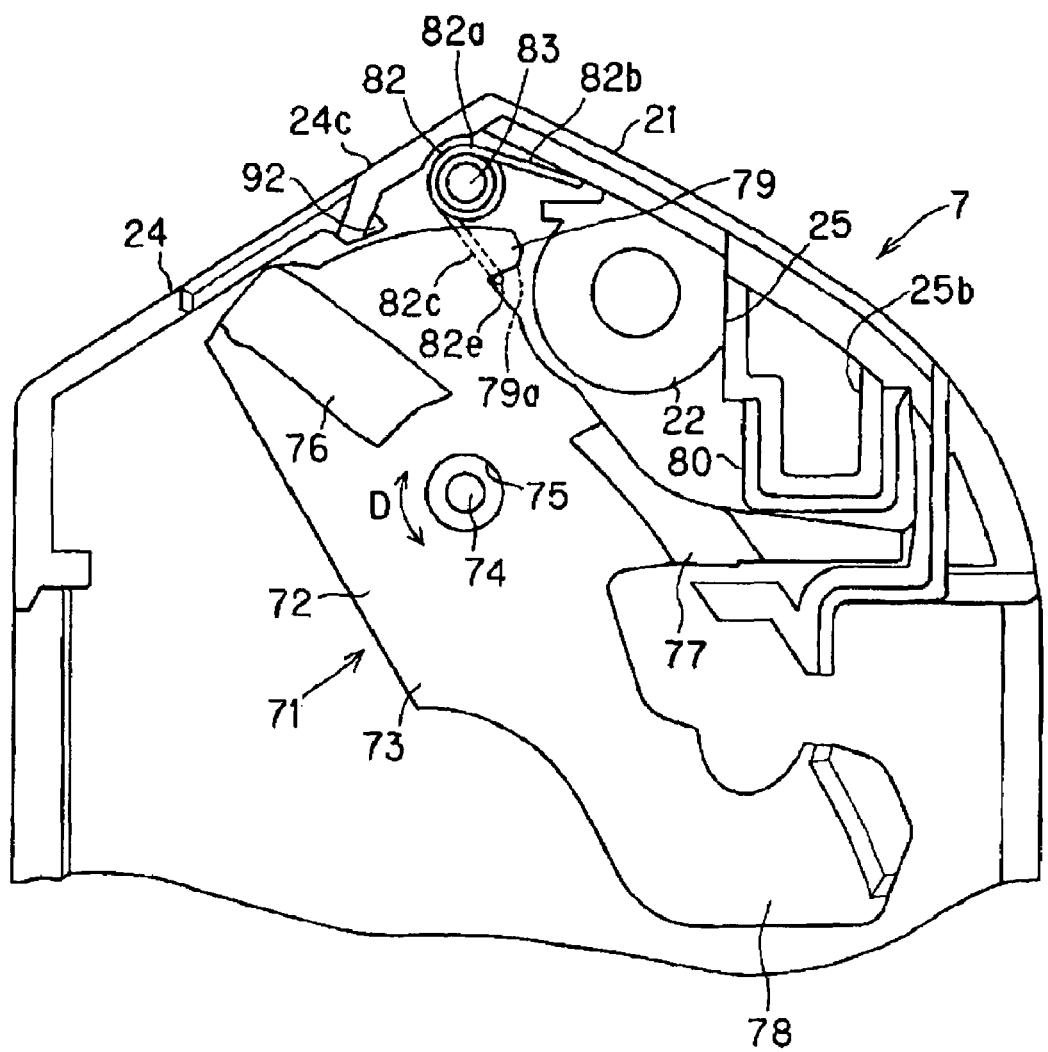
FIG. 15 is a plan view of a main portion of the lower shell showing a state that the urging member is attached to a locking member.

To explain a procedure for assembling the locking mechanism 71 as described above, first, the coil portion 82a of the urging member 82 is windingly fitted on the attachment pin 83 of the lower shell 7. The urging member 82 urges the first and second arms 82b, 82c in the open direction in which they are separated from each other. Accordingly, when the coil portion 82a is windingly fitted on the attachment pin 83, the first arm 82b on the one hand is abutted against the outer peripheral wall 21 in the vicinity of the first opening 24 of the lower shell 7, and the first arm 82b on the other hand is abutted against the outer peripheral wall 21 in the vicinity of the boss 22 as shown by a dotted line in FIG. 14. Thereafter, the second arm 82c of the urging member 82 locked to the locking piece 79 of the locking member 72 is turned in the direction of the first arm 82b against an urging force, and this state is maintained. Next, the support shaft 74 of the lower shell 7 is inserted into the shaft hole 75 of the locking member 72. When the locking member 72 is mounted on the support shaft 74, the second arm 82c turned in the direction of the first arm 82b against the urging force is locked to the locking piece 79 of the locking member 72 as shown in FIG. 15.

Figure 16:
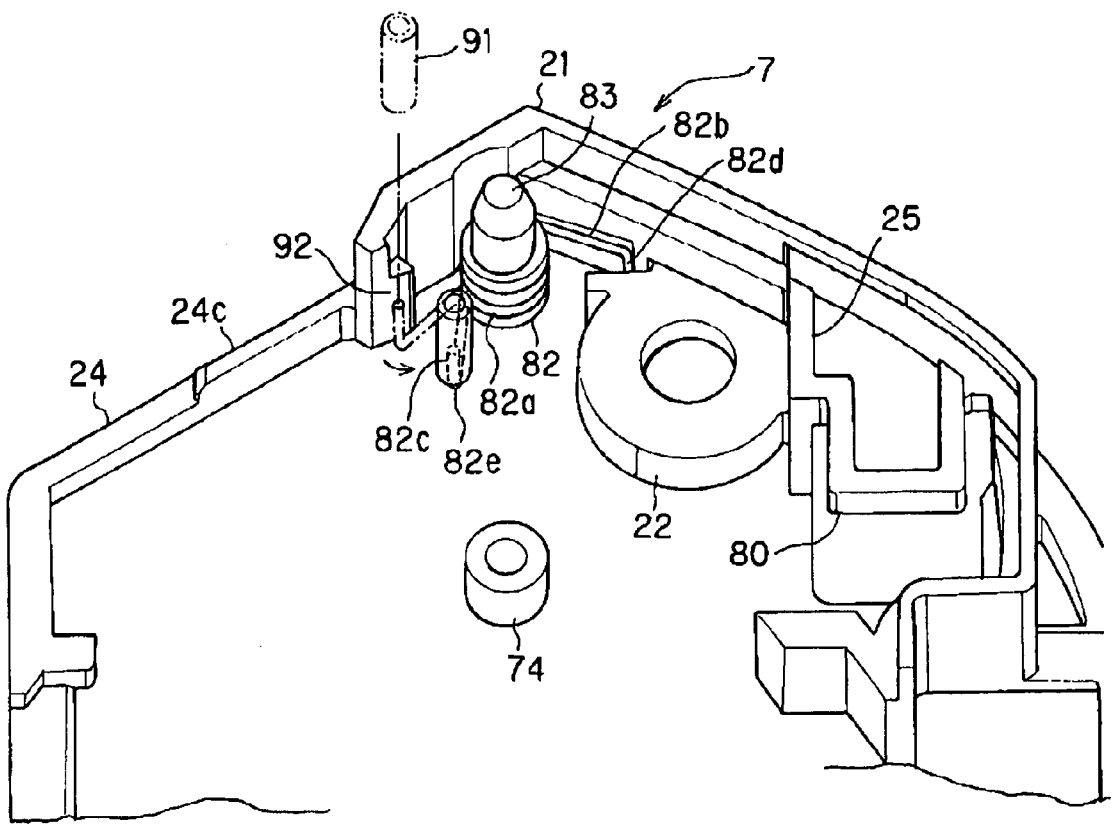
FIG. 16 is a perspective view of a main portion of the lower shell showing a state that a first locking portion of a first arm of the urging member is captured.

In a manipulation for turning the second arm 82c of the urging member 82 locked to the locking piece 79 of the locking member 72 in the direction of the first arm 82b against the urging force and permitting the second arm 82c to be locked to the locking piece 79 of the locking member 72, a cylindrical manipulation member 91 is used as shown in FIG. 16 and inserted into the second locking portion 82e of the second arm 82c. As shown in FIGS. 14 and 16, a projection 92 is formed in the vicinity of the first opening 24 of the outer peripheral wall 21 of the lower shell 7 to capture the second locking portion 82e. The projection 92 is formed at a position at which it intersects the turning locus 93 of the second arm 82c. Accordingly, although the second arm 82c is turningly urged in a direction in which it approaches the outer peripheral wall 21 in the vicinity of the first opening 24, since a gap 94 is formed between it and the outer peripheral wall 21 by the projection 92, the cylindrical manipulation member 91 can easily capture the second locking portion 82e turningly urged in a direction in which it approaches the outer peripheral wall 21 in the vicinity of the first opening 24.

Figure 17:
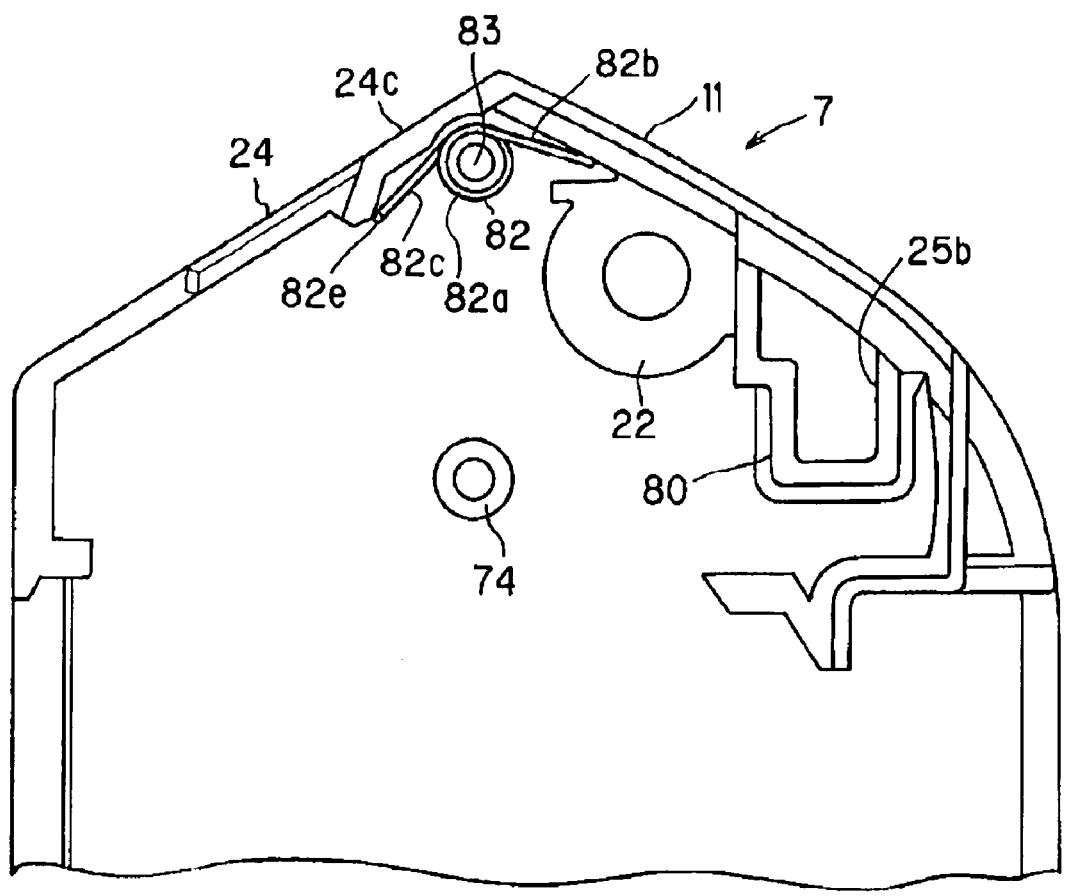
FIG. 17 is a perspective view of a main portion of the lower shell showing an example in which a capturing projection of the first locking portion of the first arm of the urging member is not disposed to an outer peripheral wall of the lower shell.

That is, as shown in FIG. 17, when the projection 92 is not formed, since the second locking portion 82e comes into contact with the outer peripheral wall 21 in a state that it is turned to and urged against it, it is impossible for the manipulation member 91 to capture the second locking portion 82e by being locked thereto, and thus productivity cannot be improved. However, when the projection 92 is provided as shown in FIG. 15, the manipulation member 91 can easily capture the second locking portion 82e through the projection 92, thereby productivity can be improved.

To explain the locking mechanism 71 in a state that the shutter plates 5a, 5b close the first and second openings 24, 44 with reference to FIG. 10, the locking member 72 is urged about the support shaft 74 by the urging force of the urging member 82 in the direction of the arrow D in FIG. 10. At the time, the locking portion 76 is engaged with the engaging recess 85 of the locking groove 84 formed on the inner surface of the rotation wheel 4. Accordingly, the locking portion 76 engaged with the engaging recess 85 prohibits that the rotation wheel 4 turns. Further, the first unlocking piece 77 is faced to the front surface opening edge side in the insertion guide groove 25b from the escape hole 80, thereby the insertion guide pin 100, which act as the unlocking pin on the recording and/or replaying device side can be depressed.

When the disc cartridge 1 is inserted into the recording and/or replaying device, the insertion guide pin 100, which act as the unlocking pin of the recording and/or replaying device, enters the insertion guide groove 25b. When the insertion guide pin 100 enters the insertion guide groove 25b from the front surface opening edge, first, it depresses the first unlocking piece 77. Thus, as shown in FIG. 10, the locking member 72 is turned about the support shaft 74 in a direction opposite to the direction of the arrow D in FIG. 10 against the urging force of the urging member 82. Accordingly, the locking portion 76 is disengaged from the engaging recess 85 in the locking groove 84, and the locking portion 76 moves in the locking groove 84 as the rotation wheel 4 rotates.

Figure 18:
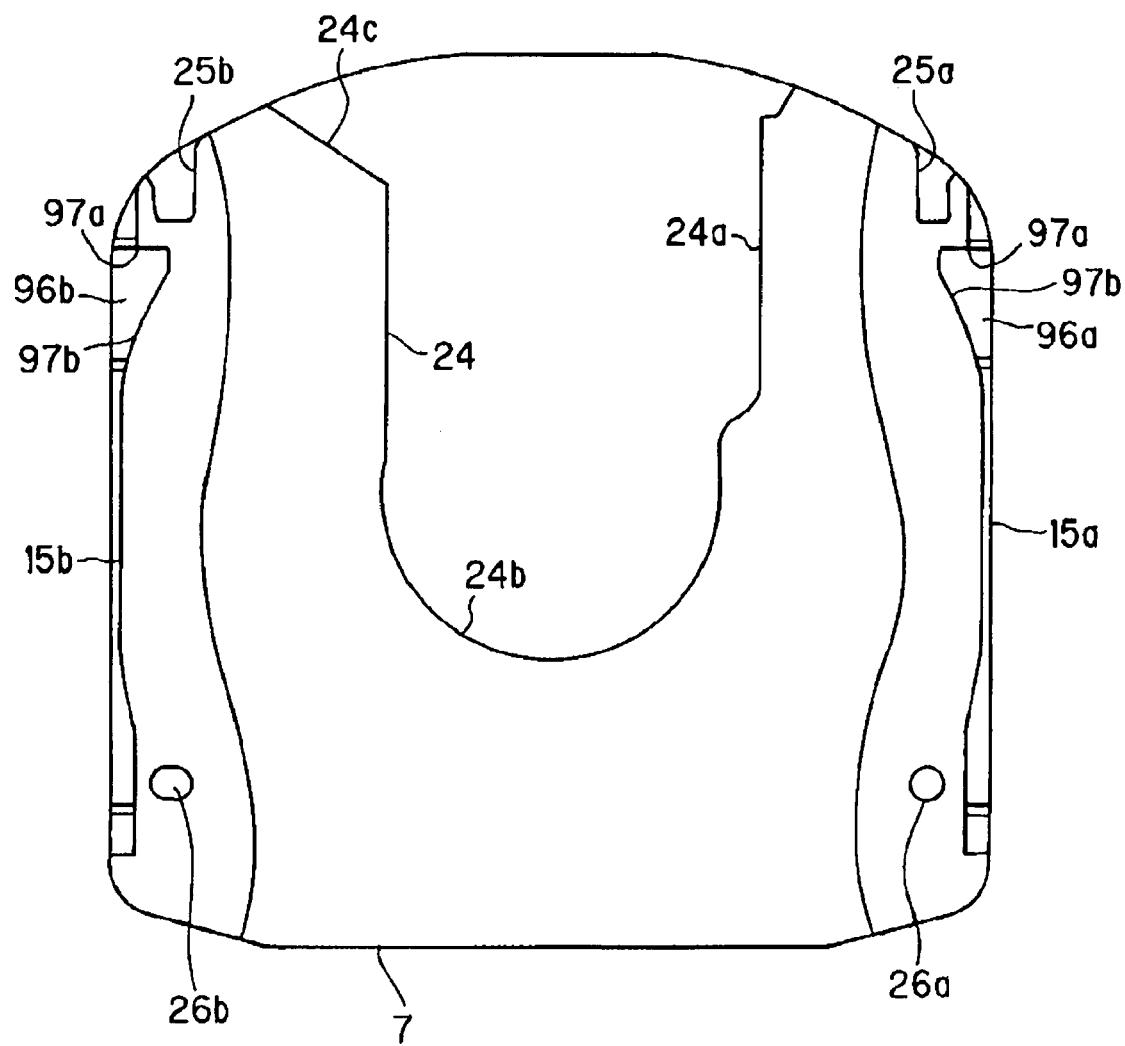
FIG. 18 is a bottom view partly in cross section of a cartridge main body.
Figure 19:
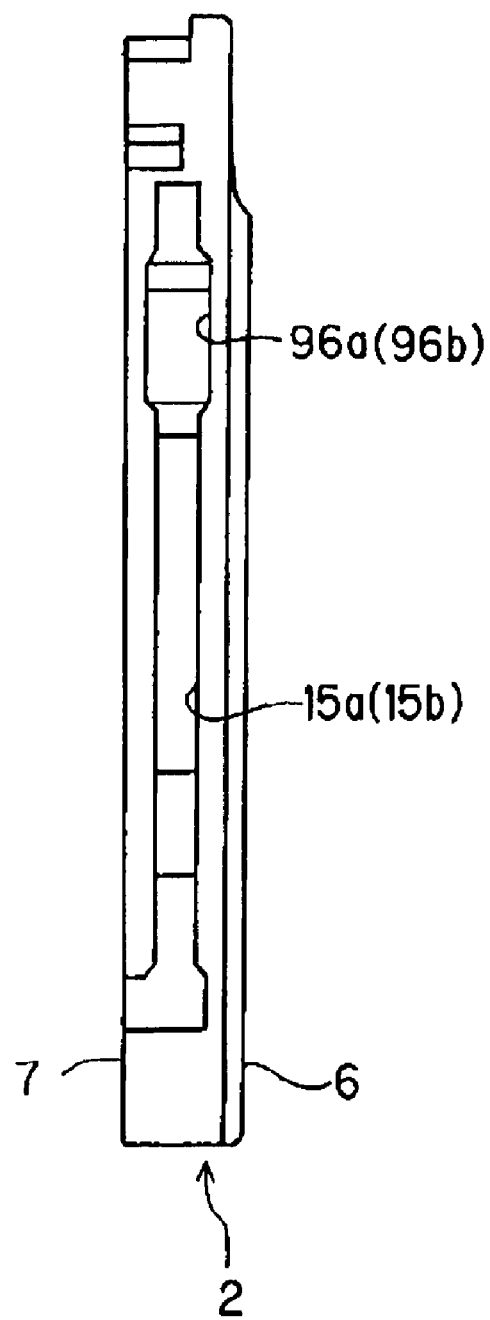
FIG. 19 is a side elevational view of the cartridge main body.

Incidentally, as shown in FIGS. 1, 18, and 19, the cartridge main body 2, which is composed of the upper shell 6 abutted against and coupled with the lower shell 7, has the recessed guide grooves 15a, 15b formed on both the side surfaces thereof in which direction the cartridge main body 2 is inserted into the recording and/or replaying device. Loading recesses 96a, 96b are formed to the guide grooves 15a, 15b continuous thereto on the front side surface of the cartridge main body 2 in the depth direction of the guide grooves 15a, 15b so that the cartridge holding piece 101 for holding the disc cartridge 1 on the recording and/or replaying device side are engaged therewith. As shown in FIG. 19, the loading recesses 96a, 96b are formed wider than the guide groove 15a, 15b so that the cartridge holding piece 101 of the recording and/or replaying device can be securely engaged therewith. As shown in FIG. 18, each of the loading recesses 96a, 96b has a vertical surface 97a on the front surface side of the cartridge main body 2 so that the cartridge holding piece 101 of the recording and/or replaying device can be securely pulled onto the mounting portion as well as has an arc-shaped bottom surface 97b which is deepest on the vertical surface 97a side.

Figure 20:
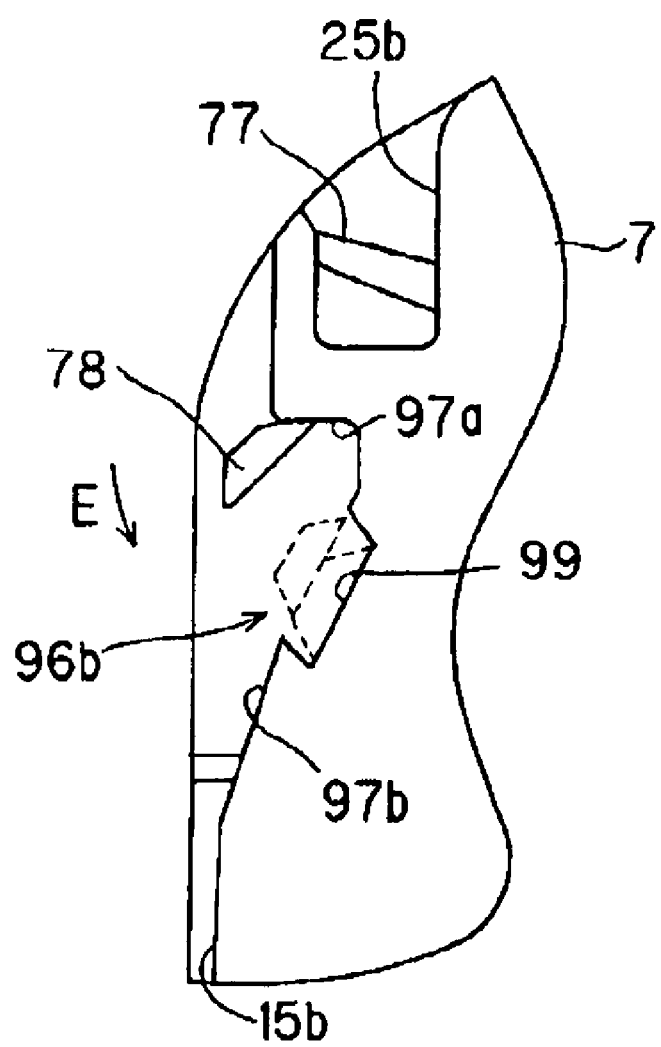
FIG. 20 is a bottom view of a main portion of the cartridge main body in the vicinity of a loading recess and shows a locking state of the shutter.
Figure 21:
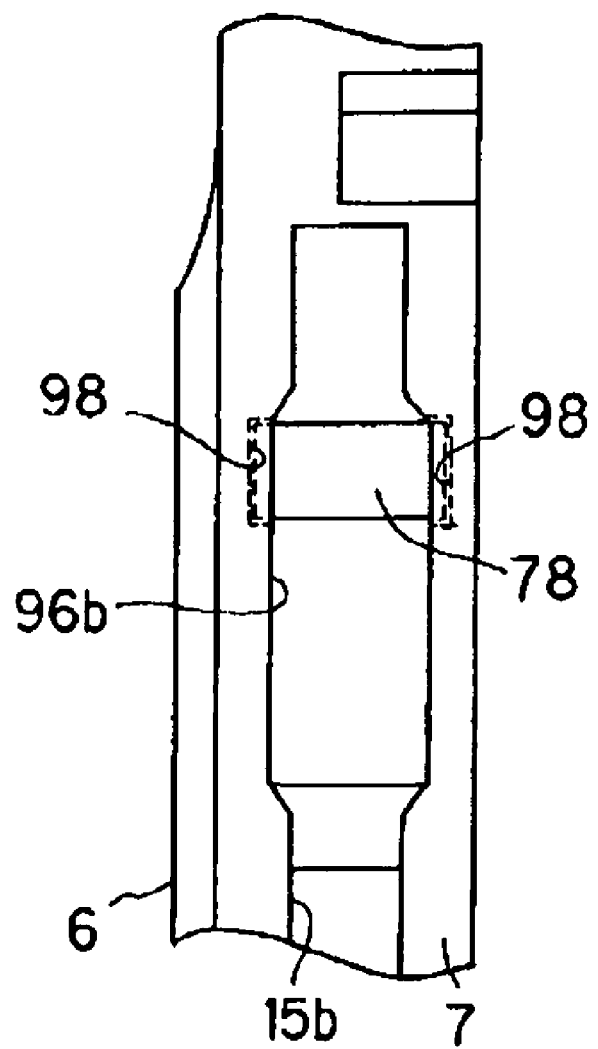
FIG. 21 is a side elevational view of a main portion of the cartridge main body in the vicinity of the loading recess.

As shown in FIG. 20, an accommodating recess 99 is formed to the arc-shaped bottom surface 97b of the loading recess 96b on the side where the locking mechanism 71 is disposed so as be continuous to the arc-shaped bottom surface 97b in a depth direction. The accommodating recess 99 is a portion to which the second unlocking piece 78 of the locking member 72 constituting the locking mechanism 71 as described above is faced and is arranged as a through-hole by the cutout portion 81 described above. Further, as shown in FIG. 21, engagement grooves 98, 98 are formed to the confronting inner surfaces in the cartridge main body 2 so as to be continuous to the accommodating recess 99. The engagement grooves 98, 98 are formed to a recessed shape in conformity with the turning locus of the second unlocking piece 78. Since a gap is eliminated by engaging the respective edges of the second unlocking piece 78 with the engagement grooves 98, 98, foreign substances such as dusts and the like are prevented from entering from the through-hole of the accommodating recess 99. When the locking member 72 turns, both the edges of the second unlocking piece 78 move in the engagement grooves 98, 98. Note that the engagement grooves 98, 98 may be formed to any one of the upper and lower shells 6, 7.

When the shutter plates 5a, 5b close the first and second openings 24, 44, since the second unlocking piece 78 is urged by the urging force of the urging member 82 in the direction of the arrow D in FIG. 10 about the support shaft 74, is located nearer to the vertical surfaces 97a of the loading recess 96b as shown in FIG. 20.

Figure 22:
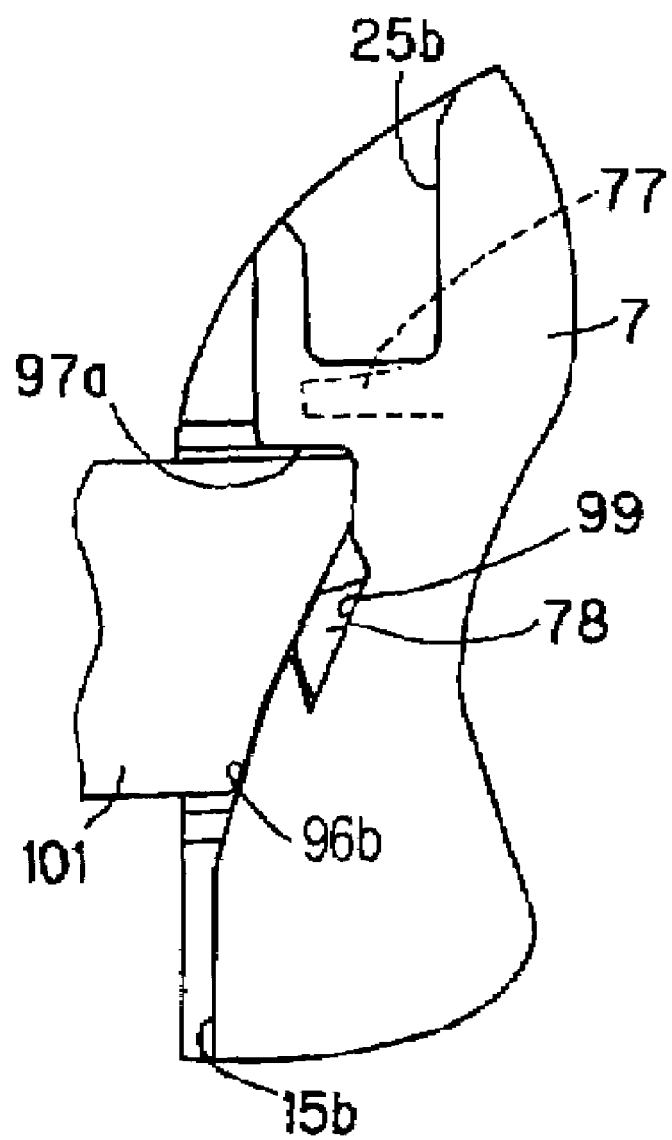
FIG. 22 is a bottom view of a main portion of the cartridge main body and shows an unlocked state achieved by manipulating a second unlocking piece.

When the disc cartridge 1 is mounted in the recording and/or replaying device, the second unlocking piece 78 is depressed in the direction of an arrow E by that the cartridge holding piece 101 on the recording and/or replaying device side enters the loading recess 96b as shown in FIG. 22, thereby the second unlocking piece 78 is accommodated in the accommodating recess 99 formed to the bottom surface of the loading recess 96b. At the time, the second unlocking piece 78 completely enters the accommodating recess 99 and does not project from the arc-shaped surface 97b acting as the bottom surface of the loading recess 96b. With this arrangement, it is possible to increase the size of the cartridge holding piece 101 of the recording and/or replaying device, thereby the disc cartridge 1 can be securely loaded.

Figure 23:
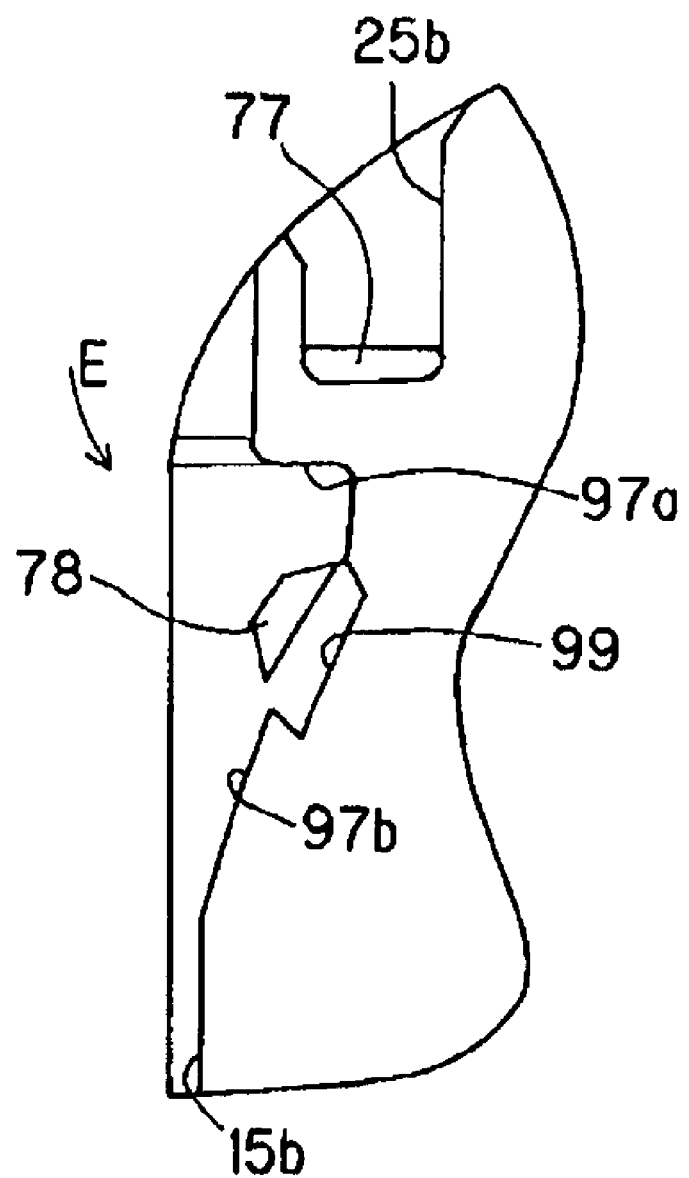
FIG. 23 is a bottom view of a main portion of the cartridge main body in the vicinity of the loading recess and shows an unlocked state achieved by manipulating a first unlocking piece.

Note that, as shown in FIG. 23, when unlocking is carried out by the first unlocking piece 77, the second unlocking piece 78 slightly projects from the accommodating recess 99.

Before the disc cartridge 1 arranged as described above is mounted in the recording and/or replaying device, it is in a state as shown in FIGS. 1, 2, and 10. That is, when the pair of shutter plates 5a, 5b closes the first and second openings 24, 44, the rotation wheel 4 is turningly urged by the urging force of the urging member 48 in the direction of the arrow A of FIG. 10, and the to-be-manipulated portion 45 is located at one side edge of the first opening 24. The second side edge 51b of the first shutter portion 51 is meshed with the first side edge 61a of the second shutter portion 61, and further the third side edge 51c of the first shutter portion 51 is meshed with the second side edge 61b of the second shutter portion 61. That is, in the disc cartridge 1, since the shutter plates 5a, 5b are meshed with each other so that they are unlike to be flexed and deformed as well as the shutter plate 5a is prevented from moving upward, foreign substances such as dusts and the like are prevented from entering the cartridge main body 2.

At the time, the guide projection 51g of the first shutter plate 5a is located at the edge of the guide groove 55 of the rotation wheel 4 near to the center thereof. The first control projection 63 is engaged with the narrow portion 64a, which acts as the first acting portion, of the first cam portion 64 of the second shutter plate 5b. Further, the second control projection 66 of the second shutter plate 5b is engaged with the first curved portion 65a, which acts as the second non-acting portion, of the second cam portion 65 of the rotation wheel 4. With this arrangement, in the disc cartridge 1, the first opening 24 of the lower shell 7 is closed as shown in FIG. 2. Further, even when the first shutter plate 5a is depressed, since the regulating projection 51h of the first shutter plate 5a is abutted against the inner peripheral non-signal recording region of the optical disc 3 and the first shutter portion 51 does not come into contact with the signal recording region of the optical disc 3, the signal recording region can be prevented from being scratched.

Further, when the shutter plates 5a, 5b close the first and second openings 24, 44, the projections 27 formed to the peripheral edge of the first opening 24 are engaged with the groove 51f of the first shutter portion 51, thereby dusts and the like can be prevented from entering the cartridge main body 2.

To explain the locking mechanism 71, the locking member 72 is urged about the support shaft 74 by the urging force of the urging member 82 in the direction of the arrow D in FIG. 10 as shown in FIG. 10. At the time, the locking portion 76 is engaged with the engaging recess 85 of the locking groove 84 formed on the inner surface the rotation wheel 4. Accordingly, engagement of the locking portion 76 with the engaging recess 85 prohibits that the rotation wheel 4 turns. Further, since the first unlocking piece 77 is faced to the front surface opening edge side in the insertion guide grooves 25b from the escape hole 80, the insertion guide pin 100 acting as an unlocking pin on the recording and/or replaying device side can be depressed, and the second unlocking piece 78 is located near to the vertical surface 97a of the loading recess 96b.

Next, a series of operations when the disc cartridge 1 arranged as described above is mounted in the recording and/or replaying device will be explained. Since the disc cartridge 1 is compatible with a standard size disc cartridge as shown in Japanese Unexamined Patent Application Publication No. 2003-109343 described above, it can be mounted in a recording and/or replaying device that can carry out recording and/or replaying to a standard size disc cartridge and in a recording and/or replaying device dedicated for the disc cartridge 1. First, an operation will be explained as to a case in which the disc cartridge 1 is mounted in the recording and/or replaying device that can carries out recording and/or replaying also to the standard size disc cartridge.

Figure 24:
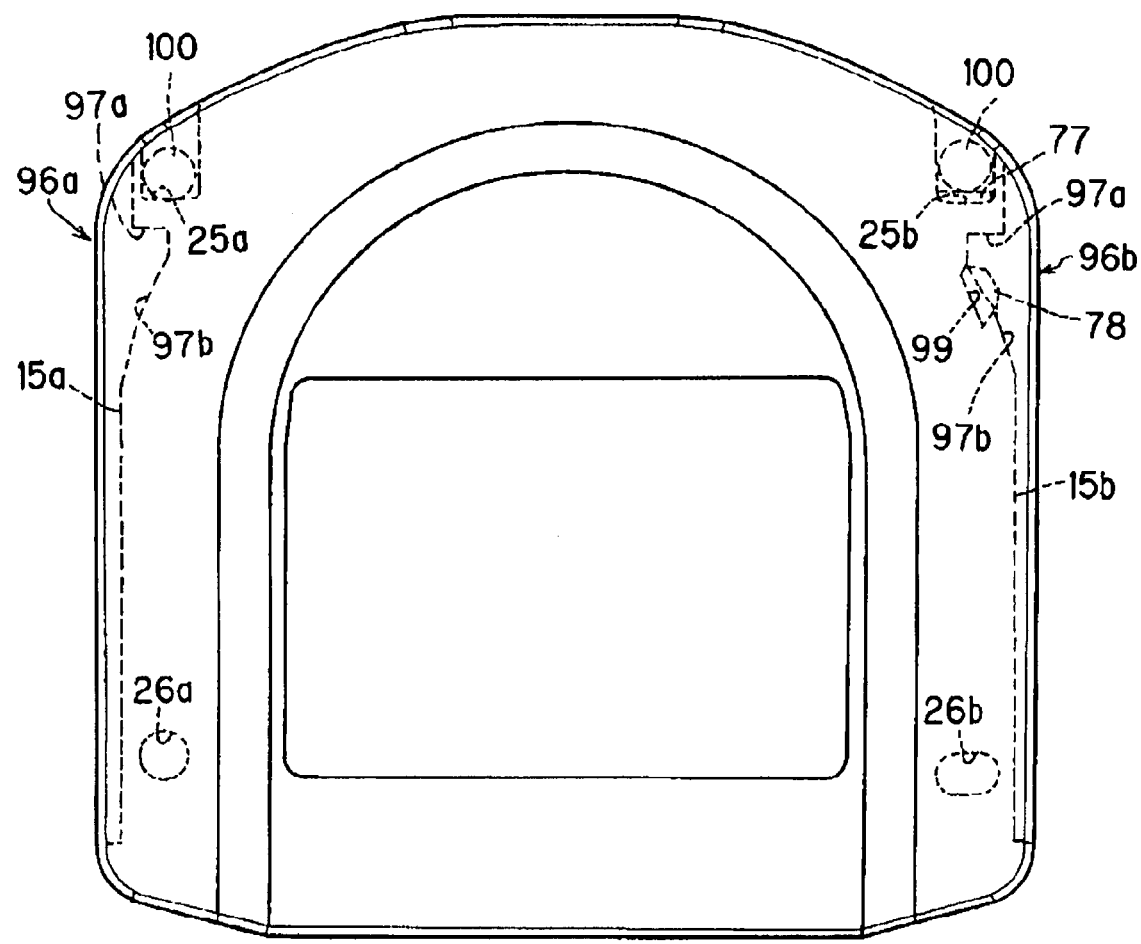
FIG. 24 is a plan view showing a state that a standard size disc cartridge is positioned to and mounted in a recording and/or replaying device which can carry out recording and/or and replaying thereto.

When the disc cartridge 1 is inserted into the recording and/or replaying device that can carry out recording and/or replaying also to the standard size disc cartridge, it is inserted into the recording and/or replaying device using the approximately arc-shaped front surface thereof as an insertion edge. When the disc cartridge 1 is inserted into the recording and/or replaying device that also copes with the standard size disc cartridge, the pair of the insertion guide pins 100 formed to the mounting portion of the recording and/or replaying device are first inserted as shown in FIG. 24. As shown in FIG. 6, since the insertion guide groove 25a, 25b are formed widest on the front opening edge sides thereof, they can securely guide the disc cartridge 1 to a predetermined position of the mounting portion. The insertion guide pins 100, 100 on the recording and/or replaying device side are engaged with A the insertion guide groove 25a, 25b just before the disc cartridge 1 is mounted to the mounting portion, thereby the disc cartridge 1 can be positioned on the mounting portion. Specifically, the disc cartridge 1 can be positioned in X- and Y-directions which are orthogonal to each other on the mounting surface by that the insertion guide pin 100, which is approximately as thick as the width of the insertion guide groove 25a, is abutted against the deepest portion of the insertion guide groove 25a. Further, even if the insertion guide pin 100, which is thinner than the width of the insertion guide groove 25a, is abutted against the deepest portion thereof and engaged therewith, the guide pin 100 can position the disc cartridge 1 in the rotation direction thereof on the mounting surface in cooperation with at least the above insertion guide pins 100 engaged with the insertion guide groove 25a. As described above, when the disc cartridge 1 is mounted on the mounting portion of the recording and/or replaying device, the disc cartridge 1 can be securely positioned on the mounting surface by the insertion guide pins 100, 100 engaged with the insertion guide groove 25a, 25b.

Note that, in the recording and/or replaying device, the location hole 26a and the alignment hole 26b, which are disposed on the bottom surface of the cartridge main body 2 of the disc cartridge 1, are not used. Further, in the recording and/or replaying device, when the disc cartridge 1 is mounted on the mounting portion, the insertion guide groove 25a is detected by a detecting portion of a not shown detection switch and the like, thereby it can be determined that the disc cartridge 1 having a recording format corresponding to the recording and/or replaying device is mounted.

When the disc cartridge 1 is mounted on the mounting portion, the insertion guide pin 100, which has entered the insertion guide groove 25b from the front opening edge acts as the unlocking pin and depresses the first unlocking piece 77. Thus, as shown in FIG. 10, the locking member 72 is turned about the support shaft 74 against the urging force of the urging member 82 in the direction opposite to the direction of the arrow D in FIG. 10. Accordingly, the locking portion 76 is disengaged from the engaging recess 85 in the locking groove 84, thereby the rotation wheel 4 is placed in a rotatable state.

Figure 25:
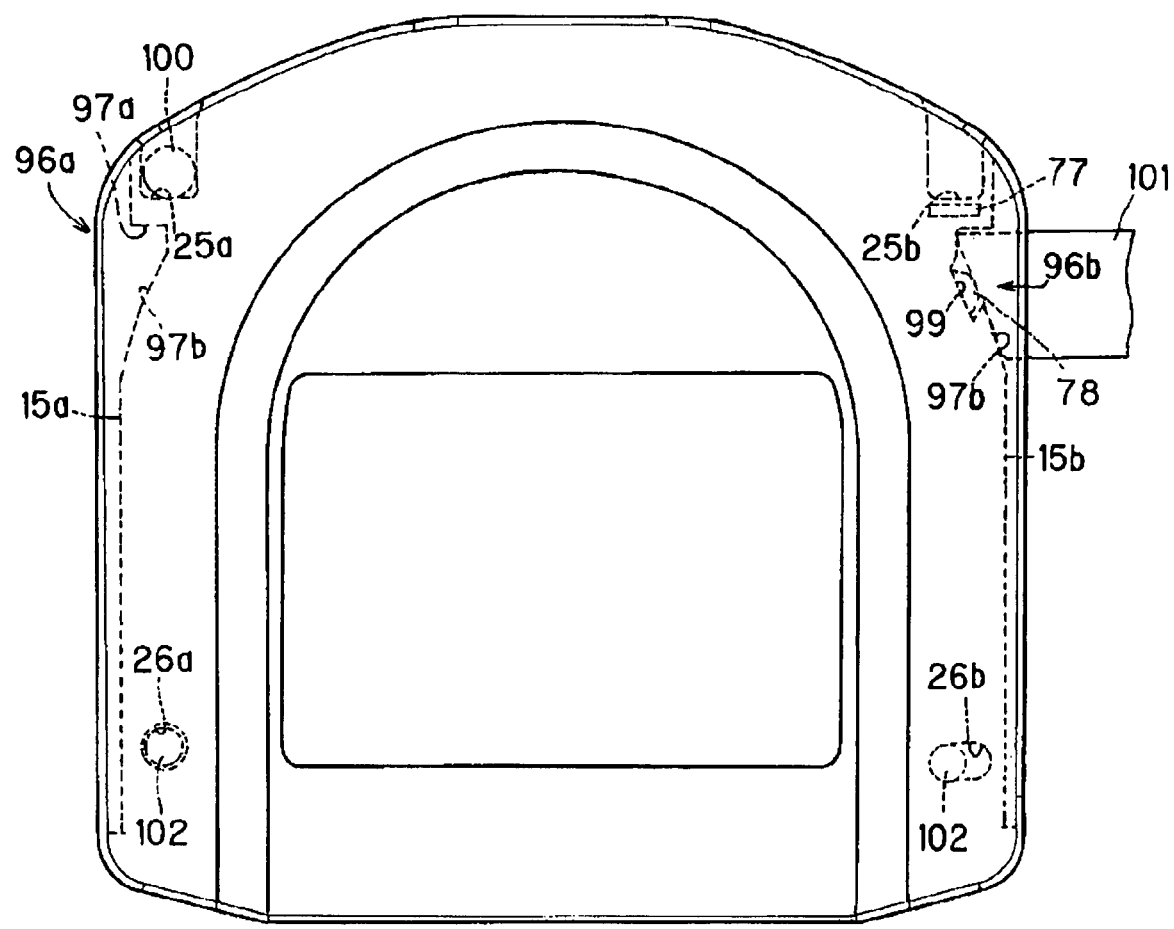
FIG. 25 is a plan view showing a state that a disc cartridge to which the present invention is applied is positioned to and mounted in a recording and/or replaying device dedicated for the disc cartridge.

Note that when the disc cartridge 1 is inserted into the recording and/or replaying device dedicated for the disc cartridge 1 using the approximately arc-shaped front surface thereof as an insertion edge, since the insertion guide pins 100 are not inserted into the insertion guide groove 25a, 25b of the front surface, the disc cartridge 1 is mounted on the mounting portion by engaging the positioning pins 102 with the location hole 26a and the alignment hole 26b formed on the bottom surface of the cartridge main body 2 in place of that it is positioned on the mounting surface by the insertion guide groove 25a, 25b as shown in FIG. 25. Then, the cartridge holding piece 101 on the recording and/or replaying device side enters the loading recess 96b and depresses the second unlocking piece 78, and the locking member 72 is turned about the support shaft 74 against the urging force of the urging member 82 in the direction opposite to the direction of the arrow D so that it is unlocked.

Even if the disc cartridge 1 is mounted in any of the recording and/or replaying devices, when the locking mechanism 71 is unlocked, since the shutter release pin 41 on the recording and/or replaying device side is engaged with the to-be-manipulated portion 45, the rotation wheel 4 is rotated by the shutter release pin 41 against the urging force of the urging member 48 in the direction opposite to the direction of the arrow A in FIG. 10. Thus, the first shutter plate 5a whose guide projection 51g is engaged with the guide groove 55 of the rotation wheel 4 is turned about the first support shaft 52 of the upper shell 6 in the direction of the arrow B in FIG. 10. As the first shutter plate 5a turns, the second shutter plate 5b is turned about the second support shaft 62a of the first shutter plate 5a in the direction of the arrow C in FIG. 10 with respect to the first shutter plate 5a. When the second shutter plate 5b begins to turn, it is turned by the narrow portion 64a of the first cam portion 64 which acts as the first acting portion with which the first control projection 63 of the rotation wheel 4 is engaged. Note that when the second shutter plate 5b begins to turn, since the first curved portion 65a of the second cam portion 65 of the rotation wheel 4 with which the second control projection 66 of the second shutter plate 5b is engaged acts as the second non-acting portion, it carries out no action.

Figure 26:
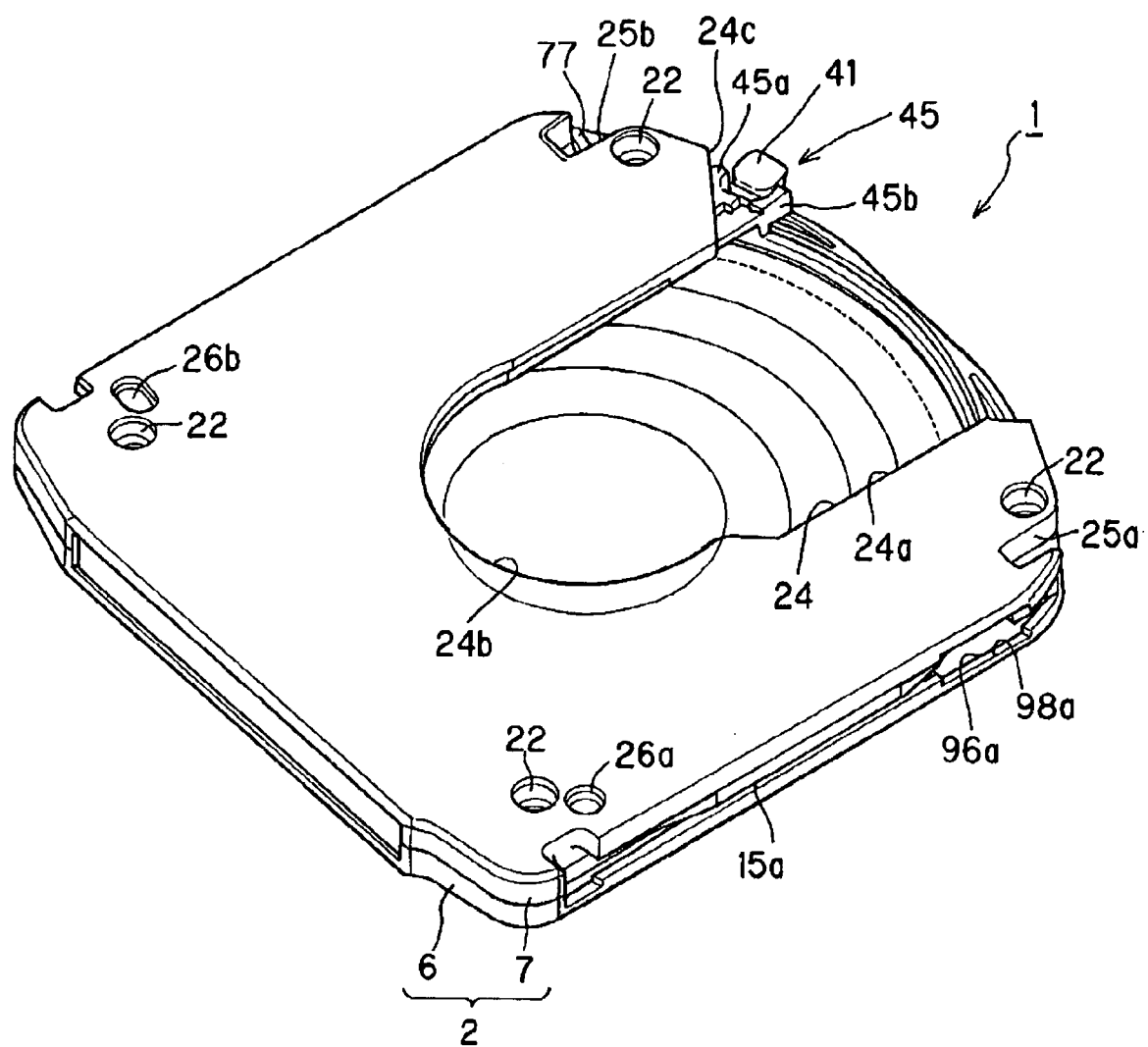
FIG. 26 is a perspective view of a disc cartridge showing a state that a first opening is released.

Further, when the rotation wheel 4 turns in the direction opposite to the direction of the arrow A in FIG. 2, the guide projection 51g engaged with the guide groove 55 of the rotation wheel 4 moves to the other edge of the guide groove 55 on the outer peripheral side of the rotation wheel 4 as shown in FIG. 11. As the first shutter plate 5a turns, the second shutter plate 5b is turned about the second support shaft 62a of the first shutter plate 5a in the direction of the arrow B in FIG. 11 with respect to the first shutter plate 5a. Thus, the first control projection 63 of the rotation wheel 4 moves from the narrow portion 64a of the first cam portion 64 acting as the first acting portion to the wide portion 64b of the first cam portion 64 acting as the first non-acting portion and carries out no action to the second shutter plate 5b. In place of the first control projection 63, the second control projection of the second shutter plate 5b moves from the first curved portion 65a acting as the second non-acting portion to the second curved portion 65b acting as the second acting portion and turns the second shutter plate 5b in the direction of the arrow C in FIG. 11. With this operation, the to-be-manipulated portion 45 is located at the portion whose width is increased by the taper portion 24c of the first opening 24, and the first and second openings 24, 44 are released as shown in FIG. 26, thereby the optical disc 3 accommodated in the rotation wheel 4 can be faced to the outside throughout the inner and outer peripheries thereof.

When the first and second opening 22, 44 are releases, the optical disc 3 rotatably accommodated in the rotation wheel 4 can be rotated by the disc table of the disc rotation drive mechanism on the recording and/or replaying device side because it is engaged with the disc table through the center hole 3a thereof as well as clamped between the clamping plate 13 disposed on the upper shell 6 and the disc table.

When information signals are recorded on the optical disc 3 or information signals recorded on the optical disc 3 are replayed, the optical disc 3 is rotated by the disc table at CLV (constant linear velocity), CAV (constant angular velocity) or a combination of them. In association with the above operation, the optical pickup, which has entered the first and second openings 24, 44, collects an optical beam with a wavelength of about 400 nm emitted from a semiconductor laser to the signal recording region of the optical disc 3 through an objective lens, irradiates the optical beam onto the signal recording surface of the optical disc 3, and detects a return optical beam reflected on the signal recording surface. As a result, the information signals are recorded onto the optical disc 3, or the information signals recorded on the optical disc 3 are read out.

Note that when the disc cartridge 1 is discharged from the recording and/or replaying device, the rotation wheel 4 is turned by the urging force of the urging member 48 in the direction of the arrow A in FIG. 10 and returns from the state shown in FIG. 11 to the state of FIG. 10. Then, the locking portion 76 of the locking member 72 moves in the locking groove 84 and is engaged with the engaging recessed portion 85, and returns to a state that the first and second openings 24, 44 are closed.

According to the disc cartridge 1 arranged as described above, when recording and/or replaying is carried out by the recording and/or replaying device capable of carrying out recording and/or replaying to a standard size the disc cartridge, the disc cartridge can be positioned on the mounting portion of the recording and/or replaying device and shutters can be unlocked by engaging insertion guide pins 100, 100 with insertion guide grooves 25a, 25b. Since it is not necessary to provide the recording and/or replaying device, which can carry out recording and replaying to the standard size disc cartridge, with the positioning pins 102 to be engaged with the location hole 26a and the alignment hole 26b formed to the bottom surface of the cartridge main body 2 by carrying out the positioning and the unlocking using the insertion guide grooves 25a, 2b as described above. Accordingly, it is possible to simplify the arrangement of the recording and/or replaying device.

Further, when recording and/or replaying is carried out by the recording and/or replaying device dedicated for the disc cartridge 1 as shown in FIG. 25, positioning can be carried out more accurately by engaging the positioning pins 102 with the location hole 26a and the alignment hole 26b formed to the bottom surface of the cartridge main body 2 in place of carrying out positioning and unlocking using the insertion guide grooves 25a, 25b. Further, unlocking can be carried out by a process for engaging the loading recess 96b necessary to load the disc cartridge 1 with the cartridge holding piece 101 on the recording and/or replaying device side, thereby it can be prevented that the arrangement of the recording and/or replaying device is made complex.

That is, in the disc cartridge 1, since the shutters can be unlocked by the first and second unlocking pieces 77, 78, a degree of freedom of design of the recording and/or replaying device can be increased.

Further, in the disc cartridge 1, when the locking mechanism 71 is assembled, since the projection 92 is provided as shown in FIGS. 14 and 16, the gap 94 is formed between the outer peripheral wall 21 and the second locking portion 82e of the second arm 82c by the projection 92, the cylindrical manipulation member 91 can easily capture the second locking portion 82e turned and urged in a direction in which it approaches the outer peripheral wall 21 in the vicinity of the first opening 24, thereby productivity can be enhanced.

Although the present invention is explained using the small disc cartridge 1 to which the present invention is applied as an example, the present invention is by no means limited thereto and can be also applied to a standard size disc cartridge as shown in Japanese Unexamined Patent Application Publication No. 2003-109343.

The invention claimed is:

1. A disc cartridge characterized by comprising:
    a cartridge main body having a first opening for recording and/or replaying formed to a bottom surface, a groove formed to a front surface acting as an insertion edge to a recording and/or replaying device, and a guide groove formed to at least one side surface adjacent to the front surface;
    a rotation wheel rotatably accommodated in the cartridge main body as well as accommodating a disc and having a second opening corresponding to the first opening for facing the accommodated disc to the outside;
    a shutter mechanism interposed between the bottom surface of the cartridge main body and the rotation wheel for releasing the first and second openings in association with the rotation of the rotation wheel when the first opening coincides with the second opening; and
    a locking member rotatably attached to the inside of the cartridge main body and having a locking portion engaged with an engaging recessed portion formed to the outer peripheral side of the rotation wheel for locking the rotation wheel at a position where the shutter mechanism closes the first opening and first and second unlocking portions for releasing the state that the locking portion is engaged with the engaging recessed portion,
    wherein the first unlocking portion is faced to the groove, and the second unlocking portion is faced to the guide groove.

2. A disc cartridge according to claim 1, characterized in that an accommodating recessed portion is formed to the guide groove for accommodating the second unlocking portion when it is depressed by a cartridge holding portion on the recording and/or replaying device side.

3. A disc cartridge according to claim 1, characterized in that the second unlocking portion is movably engaged with an engaging groove formed to at least any one of confronting surfaces of the cartridge main body.

4. A disc cartridge according to claim 2, characterized in that a loading recess is formed to the guide groove continuously thereto in the depth direction thereof, and the accommodating recessed portion is formed to the loading recess continuously thereto in the depth direction thereof.

5. A disc cartridge according to claim 4, characterized in that the loading recess is formed wider than the guide groove.

* * * * *